United States Patent
Ohishi

(10) Patent No.: US 12,020,675 B2
(45) Date of Patent: Jun. 25, 2024

(54) LAMINATE, METHOD FOR PRODUCING LAMINATE, STRUCTURE PROVIDED WITH LAMINATE, AND METHOD FOR PROTECTING OR REPAIRING STRUCTURE

(71) Applicant: DENKA COMPANY LIMITED, Tokyo (JP)

(72) Inventor: Masayuki Ohishi, Isesaki (JP)

(73) Assignee: DENKA COMPANY LIMITED, Tokyo (JP)

( * ) Notice: Subject to any disclaimer, the term of this patent is extended or adjusted under 35 U.S.C. 154(b) by 562 days.

(21) Appl. No.: 17/285,446

(22) PCT Filed: Sep. 4, 2019

(86) PCT No.: PCT/JP2019/034869
§ 371 (c)(1),
(2) Date: Apr. 14, 2021

(87) PCT Pub. No.: WO2020/079980
PCT Pub. Date: Apr. 23, 2020

(65) Prior Publication Data
US 2021/0343265 A1    Nov. 4, 2021

(30) Foreign Application Priority Data
Oct. 18, 2018  (JP) .................. 2018-197027

(51) Int. Cl.
*G10K 11/168*    (2006.01)
*B32B 7/12*    (2006.01)
(Continued)

(52) U.S. Cl.
CPC .............. *G10K 11/168* (2013.01); *B32B 7/12* (2013.01); *B32B 27/08* (2013.01); *B32B 27/18* (2013.01);
(Continued)

(58) Field of Classification Search
CPC ......... G10K 11/168; B32B 7/12; B32B 27/08; B32B 27/18; B32B 27/308; B32B 27/304;
(Continued)

(56) References Cited

U.S. PATENT DOCUMENTS 5,122,403 A  *  6/1992  Roginski ........... B32B 17/10302
                                                            156/107
6,444,311 B1       9/2002  Friedman et al.
(Continued)

FOREIGN PATENT DOCUMENTS

JP          6921944 U    2/1984
JP          S618349 A    1/1986
(Continued)

OTHER PUBLICATIONS

English abstract for TW 201815581 A (2018).
(Continued)

*Primary Examiner* — Forrest M Phillips
(74) *Attorney, Agent, or Firm* — Caesar Rivise, PC

(57) ABSTRACT

A laminate including at least layers A to C in this order, wherein an integrated value from 0 mm to 50 mm of displacement calculated from a load-displacement diagram obtained by carrying out a tensile property test method is 1.0 Nm (=J) or more; and an adhesive strength between the layer B and the layer C is 10 N/25 mm or more.

23 Claims, 3 Drawing Sheets

(51) Int. Cl.
  *B32B 27/08* (2006.01)
  *B32B 27/18* (2006.01)
  *B32B 27/30* (2006.01)

(52) U.S. Cl.
  CPC .......... *B32B 27/304* (2013.01); *B32B 27/308* (2013.01); *B32B 2250/03* (2013.01); *B32B 2250/24* (2013.01); *B32B 2307/102* (2013.01); *B32B 2307/518* (2013.01)

(58) Field of Classification Search
  CPC ............ B32B 2250/03; B32B 2250/24; B32B 2307/102; B32B 2307/518
  See application file for complete search history.

(56) References Cited

U.S. PATENT DOCUMENTS

| | | | |
|---|---|---|---|
| 10,696,026 B2 * | 6/2020 | Harthcock | .............. B32B 17/04 |
| 11,462,804 B2 * | 10/2022 | Imoto | ................. H01M 4/1393 |
| 2002/0028312 A1 | 3/2002 | Onozawa et al. | |
| 2002/0150763 A1 | 10/2002 | Silagy et al. | |
| 2003/0170469 A1 * | 9/2003 | Ikuta | ....................... B32B 25/20 |
| | | | 428/447 |
| 2008/0145652 A1 | 6/2008 | Bonnet et al. | |
| 2011/0247681 A1 | 10/2011 | Wu | |
| 2013/0130003 A1 | 5/2013 | Choi et al. | |
| 2017/0129231 A1 | 5/2017 | Tomizawa et al. | |
| 2017/0204297 A1 | 7/2017 | Hasumi et al. | |
| 2017/0297307 A1 | 10/2017 | Shinmyo et al. | |
| 2018/0258323 A1 | 9/2018 | Hiraki et al. | |

FOREIGN PATENT DOCUMENTS

| | | | |
|---|---|---|---|
| JP | 6105259 A | 4/1993 | |
| JP | 7299890 A | 11/1995 | |
| JP | 10193483 A | 7/1998 | |
| JP | 2001171055 A | 6/2001 | |
| JP | 200236441 A | 2/2002 | |
| JP | 2002234121 A | 8/2002 | |
| JP | 2003247210 A | 9/2003 | |
| JP | 2004223919 A | 8/2004 | |
| JP | 2008531329 A | 8/2008 | |
| JP | 2012219199 A | 11/2012 | |
| JP | 2013-507270 A | 3/2013 | |
| JP | 2013526033 A | 6/2013 | |
| JP | 2013199077 A | 10/2013 | |
| JP | 2014176998 A | 9/2014 | |
| JP | 2016124105 A | 7/2016 | |
| JP | 2016125193 A | 7/2016 | |
| JP | 2016144926 A | 8/2016 | |
| TW | 201815581 A | 5/2018 | |
| WO | 2013146820 A1 | 10/2013 | |
| WO | 2016010013 A1 | 1/2016 | |
| WO | 2016017339 A1 | 2/2016 | |
| WO | 2017047600 A1 | 3/2017 | |
| WO | 2017208885 A1 | 12/2017 | |

OTHER PUBLICATIONS

Machine translation for WO 2017208885 A1 (2017).
Machine Translation for JP S618349 A (1986).
Machine Translation for JP 2003247210 A (2003).
Extended European Search Report dated Nov. 2, 2021.
International Search Report for PCT/JP2019/034869, date of mailing Nov. 26, 2019.
English-language translation of JP 59-21944.
English-language abstract of JP 1993-105259.
English-language abstract of JP 1995-299890.
English-language abstract of JP 1998-193483.
English-language abstract of JP 2004-223919.
English-language abstract of JP 2012-219199.
English-language abstract of JP 2013-199077.
English-language abstract of JP 2014-176998.
English-language abstract of JP 2016-124105.
English-language abstract of JP 2016-125193.

* cited by examiner

LAMINATE, METHOD FOR PRODUCING LAMINATE, STRUCTURE PROVIDED WITH LAMINATE, AND METHOD FOR PROTECTING OR REPAIRING STRUCTURE

CROSS-REFERENCE TO RELATED APPLICATIONS

This application is a U.S. National Phase Application of PCT/JP2019/034869, filed Sep. 4, 2019, which claims priority to JP 2018-197027, filed Oct. 18, 2018, the contents of which applications are incorporated herein by reference in their entireties for all purposes.

FIELD OF THE INVENTION

The present invention relates to a laminate and a method for manufacturing the same. In particular, the present invention relates to a laminate suitable for protection or repair of various structures used indoors and outdoors, and a method for manufacturing the same. Further, the present invention also relates to a structure including such a laminate. Further, the present invention also relates to a method for protecting or repairing a structure.

BACKGROUND OF THE INVENTION

In recent years, various structures such as sound insulation walls, light transmissive panels, concrete structures, and bridges used indoors and outdoors may be concerned about deterioration in appearance and strength due to aging deterioration, and deterioration in safety due to scattering of fragments generated due to breakage or collapse, and the like. Accordingly, by attaching laminates such as a sheet (including a film) to the surface of the structure, various structures that have deteriorated over time are protected and repaired, and various proposals have been made with the aim of imparting functionality to the laminate and improving its characteristics (Patent Literature 1 to 13).

CITATION LIST

Patent Literature

[Patent Literature 1] Japanese Patent Application Publication No. 2002-036441
[Patent Literature 2] Japanese Patent Application Publication No. 2014-176998
[Patent Literature 3] WO 2016/017339
[Patent Literature 4] Japanese Patent Application Publication No. 2013-507270
[Patent Literature 5] Japanese Patent Application Publication No. H07-299890
[Patent Literature 6] WO 2016/010013
[Patent Literature 7] WO 2017/047600
[Patent Literature 8] Japanese Patent Application Publication No. 2001-171055
[Patent Literature 9] Japanese Patent Application Publication No. 2002-234121
[Patent Literature 10] Japanese Patent Application Publication No. 2004-223919
[Patent Literature 11] Japanese Patent Application Publication No. 2012-219199
[Patent Literature 12] Japanese Patent Application Publication No. 2013-199077
[Patent Literature 13] WO 2013/146820

SUMMARY OF THE INVENTION

However, according to the results of the study by the present inventor, there is still room for improvement in the laminates according to the prior art from the viewpoint of achieving both antifouling property and anti-scattering property. In view of the above circumstances, one of the objects of the present invention is to provide a laminate capable of improving the antifouling property and the anti-scattering property of various structures at a high level by attaching the laminate to the structure. It is another object of the present invention is to provide a method for manufacturing such a laminate. It is yet another object of the present invention is to provide a structure provided with such a laminate. Further, it is yet another object of the present invention is to provide a method for protecting or repairing a structure.

As a result of diligent research to achieve the above objects, the present inventor has found that the above problems can be solved when at least the following layers A to C are provided, and an integrated value from 0 mm to 50 mm of displacement calculated from a load-displacement diagram obtained by the following tensile test is 1.0 Nm (=J) or more, and an adhesive strength between the layer B and the layer C is 10 N/25 mm or more. The present invention is completed accordingly, and is exemplified as below. In particular, in the laminate of the present invention, the range of the integrated value from 0 mm to 50 mm of displacement calculated from the above load-displacement diagram, which is 1.0 Nm (=J) or more, is distinct from that of conventional laminates of the same type and is considered to be a major factor for solving the problems by the present invention.

[1]

A laminate, comprising at least following layers A to C in this order, wherein an integrated value from 0 mm to 50 mm of displacement calculated from a load-displacement diagram obtained by carrying out a tensile property test method in accordance with JIS K7161-1994 under conditions of test speed: 200 mm/min, gauge length: 50 mm, and width of test piece: 10 mm is 1.0 Nm (=J) or more; and an adhesive strength between the layer B and the layer C measured in accordance with JIS Z0237-2009 is 10 N/25 mm or more.

The layer A: a layer composed of a resin composition comprising 50 parts by mass or more and 100 parts by mass or less of a polyvinylidene fluoride-based resin, and 0 parts by mass or more and 50 parts by mass or less of a poly (meth) acrylic acid ester-based resin (assuming a total of both being 100 parts by mass).

The layer B: a layer composed of a resin composition comprising 0 parts by mass or more and less than 50 parts by mass of a polyvinylidene fluoride-based resin and more than 50 parts by mass and 100 parts by mass or less of a poly (meth) acrylic acid ester-based resin (assuming a total of both being 100 parts by mass). The layer C: a layer composed of a resin or a resin composition that exhibits ductile fracture and has a yield point.

[2]

The laminate according to [1], wherein a total content of the polyvinylidene fluoride-based resin and the poly (meth) acrylic acid ester-based resin in the resin composition composing the layer A is 80% by mass or more.

[3]

The laminate according to [1] or [2], wherein a total content of the polyvinylidene fluoride-based resin and the poly (meth) acrylic acid ester-based resin in the resin composition composing the layer B is 80% by mass or more.

[4]

The laminate according to any one of [1] to [3], wherein when carrying out the tensile property test method in accordance with JIS K7161-1994 under conditions of test speed: 200 mm/min, gauge length: 50 mm, and width of test piece: 10 mm, a nominal tensile strain (elongation) of the layer C is 100% or more.

[5]

The laminate according to any one of [1] to [4], wherein a total light transmittance measured according to a measurement method specified in JIS K7361-1-1997 is 90% or more.

[6]

The laminate according to any one of [1] to [5], wherein a HAZE measured according to a measurement method specified in JIS K7136-2000 is 60% or less.

[7]

The laminate according to any one of [1] to [6], wherein the resin composition composing the layer B contains 0.05 to 15 parts by mass of an ultraviolet absorber.

[8]

The laminate according to any one of [1] to [7], wherein the resin or the resin composition composing the layer C comprises one or more selected from a group consisting of polycarbonate-based resin, polyamide-based resin, polyethylene terephthalate-based resin, polyvinyl chloride-based resin, and acrylonitrile-butadiene-styrene copolymer (ABS resin).

[9]

The laminate according to [8], wherein a total content of polycarbonate-based resin, polyamide-based resin, polyethylene terephthalate-based resin, polyvinyl chloride-based resin, and acrylonitrile-butadiene-styrene copolymer (ABS resin) in the resin or the resin composition composing the layer C is 80% by mass or more.

[10]

The laminate according to any one of [1] to [9], wherein the layer C is a biaxially oriented layer.

[11]

The laminate according to any one of [1] to [10], wherein the layer B and the layer C are in direct contact with each other.

[12]

A method for manufacturing the laminate according to [11], comprising following steps.
Step 1: a step of preparing a laminate in which the layer A and the layer B are laminated.
Step 2-A: a step of heat-sealing the layer C on a surface of the laminate opposite to a side on which the layer A is laminated with respect to the layer B.

[13]

The laminate according to any one of [1] to [10], wherein a layer D composed of an adhesive is laminated between the layer B and the layer C.

[14]

A method for manufacturing the laminate according to [13], comprising following steps.
Step 1: a step of preparing a laminate in which the layer A and the layer B are laminated.
Step 2-B1: a step of forming the layer D on a surface of the laminate after Step 1 opposite to a side on which the layer A is laminated with respect to the layer B.
Step 2-C1: a step of forming the layer C on a surface of the laminate after Step 2-B1 opposite to a side on which the layer B is laminated with respect to the layer D.

Alternatively,
Step 1: a step of preparing a laminate in which the layer A and the layer B are laminated.
Step 2-B2: a step of preparing a laminate in which the layer C and the layer D are laminated.
Step 2-C2: a step of attaching a surface of the laminate after Step 1 opposite to a side on which the layer A is laminated with respect to the layer B to a surface of the laminate after Step 2-B2 opposite to a side on which the layer C is laminated with respect to the layer D.

[15]

A laminate, wherein a layer E composed of an adhesive is laminated on a surface of the laminate according to any one of [1] to [11] and [13] opposite to a side on which the layer B is laminated with respect to the layer C.

[16]

The laminate according to [15], wherein the adhesive composing the layer E is a two-component mixing type pressure sensitive adhesive, a two-component curable adhesive, a thermosetting adhesive, or a UV curable adhesive.

[17]

The method for manufacturing a laminate according to [15] or [16], further comprising a following step after Step 2-A according to [12], or Step 2-C1 or Step 2-C2 according to [14].
Step 3-A: a step of forming the layer E on a surface of the laminate opposite to a side on which the layer B is laminated with respect to the layer C.

[18]

A structure in which the laminate according to [15] or [16] is attached to the structure with the layer E as an attachment side.

[19]

The structure according to [18], wherein the structure is composed of one or more types of material selected from a group consisting of poly (meth) acrylic acid ester-based resin, polyvinyl chloride-based resin, polycarbonate-based resin, polystyrene-based resin, acrylonitrile-butadiene-styrene copolymer (ABS resin), glass, concrete and metal.

[20]

The structure according to [18] or [19], wherein the structure is a sound insulation wall or an exterior panel that is light transmissive or non-light transmissive.

[21]

The structure according to [20], wherein the structure is the sound insulation wall that has been installed for one year or more or the exterior panel that has been installed for one year or more.

[22]

A method for protecting or repairing a structure, comprising a step of attaching the laminate according to [15] or [16] to the structure with the layer E as an attachment side.

[23]

The method for protecting or repairing a structure according to [22], wherein the structure is composed of one or more types of material selected from a group consisting of poly (meth) acrylic acid ester-based resin, polyvinyl chloride-based resin, polycarbonate-based resin, polystyrene-based resin, acrylonitrile-butadiene-styrene copolymer (ABS resin), glass, concrete and metal.

[24]

The method for protecting or repairing a structure according to [22] or [23], wherein the structure is a sound insulation wall or an exterior panel.

[25]

The method for protecting or repairing a structure according to [24], wherein the structure is the sound insulation wall that has been installed for one year or more or the exterior panel that has been installed for one year or more.

According to one embodiment of the present invention, it is possible to provide a laminate capable of improving the antifouling property and the anti-scattering property of various structures at a high level by attaching the laminate to the structure. Therefore, the structure in which the laminate according to one embodiment of the present invention is attached to its surface can be used for a long period of time, and the fragments of the structure are less likely to scatter even when subjected to an impact, so it is possible to increase the safety of the structure.

BRIEF DESCRIPTION OF THE DRAWINGS

FIG. 1-2 is a schematic view showing the lamination structure of the laminate according to the second embodiment of the present invention.

FIG. 1-3 is a schematic view showing the lamination structure of the laminate according to the third embodiment of the present invention.

FIG. 1-4 is a schematic view showing the lamination structure of the laminate according to the fourth embodiment of the present invention.

FIG. 2-1 is a schematic view showing the lamination structure of the structure according to the first embodiment of the present invention.

FIG. 2-2 is a schematic view showing the lamination structure of the structure according to the second embodiment of the present invention.

FIG. 3 is an example of a load-displacement diagram.

DETAILED DESCRIPTION OF THE INVENTION

Hereinafter, embodiments of the present invention will be described. The embodiments described below exemplify typical embodiments of the present invention but are not intended to narrowly interpret the technical scope of the present invention.

1. Laminate

Figure 1:
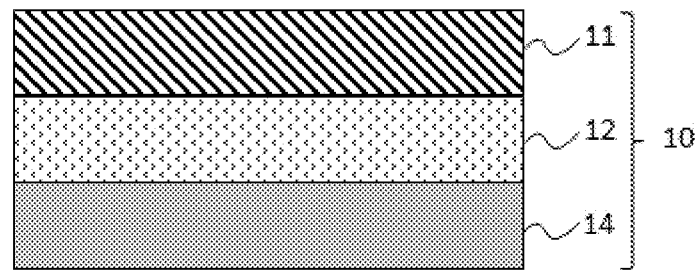
FIG. 1-1 is a schematic view showing the lamination structure of the laminate according to the first embodiment of the present invention.

FIG. 1-1 is a schematic view showing the lamination structure of the laminate (10) according to the first embodiment of the present invention. The laminate (10) in FIG. 1-1 comprises a layer A (11), a layer B (12) laminated on one surface of the layer A, and a layer C (14) provided on a surface opposite to the side on which the layer A (11) is laminated with respect to the layer B (12). In this embodiment, the layer B and the layer C are in direct contact with each other.

The laminate (10) can be manufactured, for example, by carrying out the following steps.
Step 1: a step of preparing a laminate in which the Layer A (11) and the layer B (12) are laminated.
Step 2-A: a step of heat-sealing the layer C (14) on a surface of the laminate opposite to a side on which the layer A (11) is laminated with respect to the layer B (12).

The laminate in which the layer A (11) and the layer B (12) are laminated can be prepared by, for example, a coextrusion molding method in which a plurality of resins is bonded and laminated in a molten state using a plurality of extrusion molding machines. Examples of coextrusion molding method include a multi-manifold die method in which each layer is contact-bonded at the tip inside a T-die after a plurality of resins is made into a sheet, a feed block die method that spreads a plurality of resins into a sheet after bonding them in a merging device (feed block), and a dual slot die method in which a plurality of resins is molded into sheets and then each layer is brought into contact at the tip of the outside of a T die to be bonded. In addition, it can also be prepared by an inflation molding method using a round die.

Further, there is a so-called extrusion laminating method, in which of the layers to be integrally bonded, one layer is formed into a film in advance, and the other layer is press-bonded with heat or an adhesive (generally, the adhesive is applied in advance) while being extruded. Further, there is also a method in which both layers are formed into a film in advance and then the two layers are integrated by using heat or an adhesive, but this method is disadvantageous in terms of the number of steps and cost.

When molding a laminate in which the layer A and the layer B are laminated, in order to enhance the transparency of the laminate, it is preferable to use a pinch roll with a mirror finish for taking over the laminate.

Figures 1, 2:
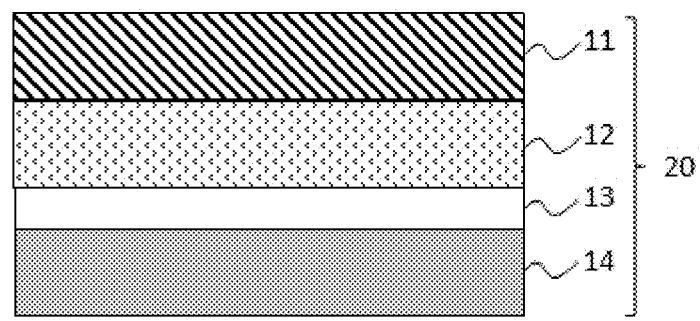

FIG. 1-2 is a schematic view showing the lamination structure of the laminate (20) according to the second embodiment of the present invention. The laminate (20) of the second embodiment is different from the laminate (10) of the first embodiment in that a layer D (13) composed of an adhesive is further provided between the layer B (12) and the layer C (14). The layer D (13) can increase the adhesive strength between the layer B (12) and the layer C (14) when the adhesive strength is low.

The laminate (20) can be manufactured, for example, by carrying out the following steps.
Step 1: a step of preparing a laminate in which the layer A (11) and the layer B (12) are laminated.
Step 2-B1: a step of forming the layer D (13) on a surface of the laminate after Step 1 opposite to a side on which the A (11) layer is laminated with respect to the layer B (12).
Step 2-C1: a step of forming the layer C (14) on a surface of the laminate after Step 2-B1 opposite to a side on which the B (12) layer is laminated with respect to the layer D (13).

Alternatively, the laminate (20) can also be manufactured by performing the following steps.
Step 1: a step of preparing a laminate in which the layer A (11) and the layer B (12) are laminated.
Step 2-B2: a step of preparing a laminate in which the layer C (14) and the layer D (13) are laminated.
Step 2-C2: a step of attaching a surface of the laminate after Step 1 opposite to a side on which the layer A (11) is laminated with respect to the layer B (12) to a surface of the laminate after Step 2-B2 opposite to a side on which the layer C (14) is laminated with respect to the layer D (13).

Figures 1, 2, 3:
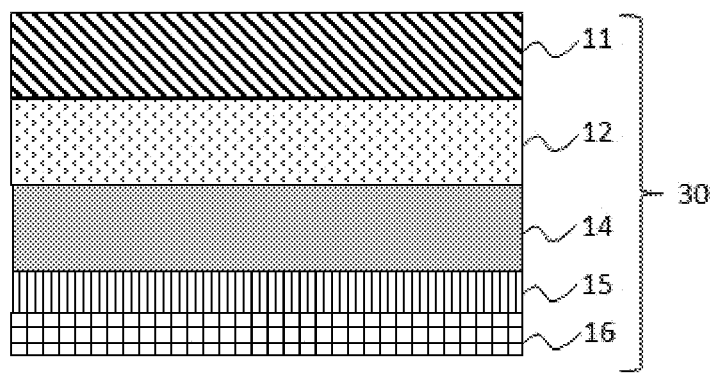
Figures 1, 2, 3, 4:
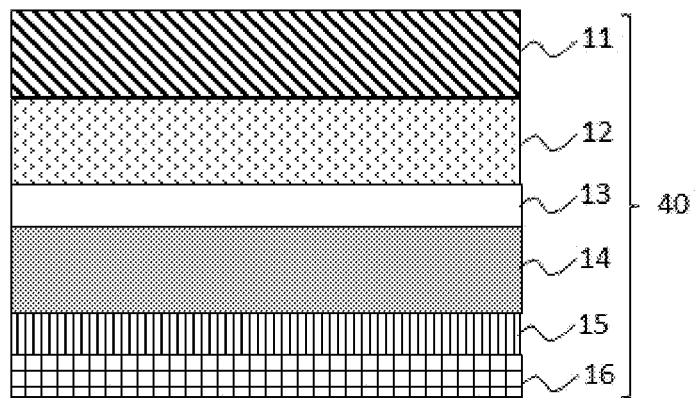
Figures 1, 2:
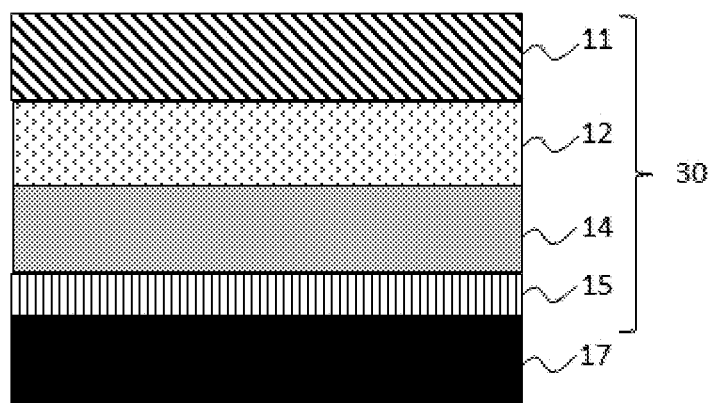
Figure 2:
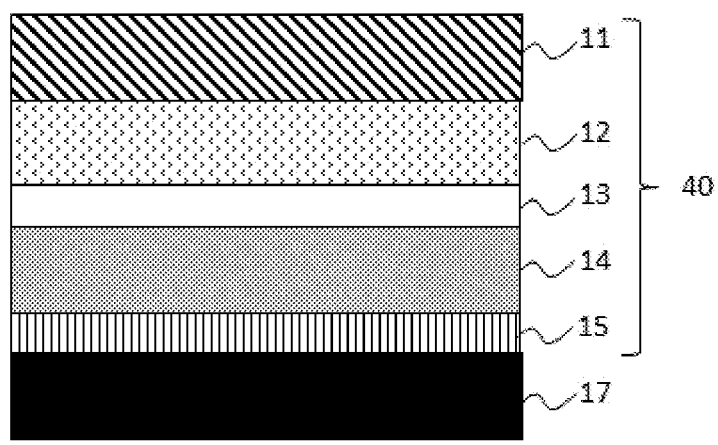
Figure 3:
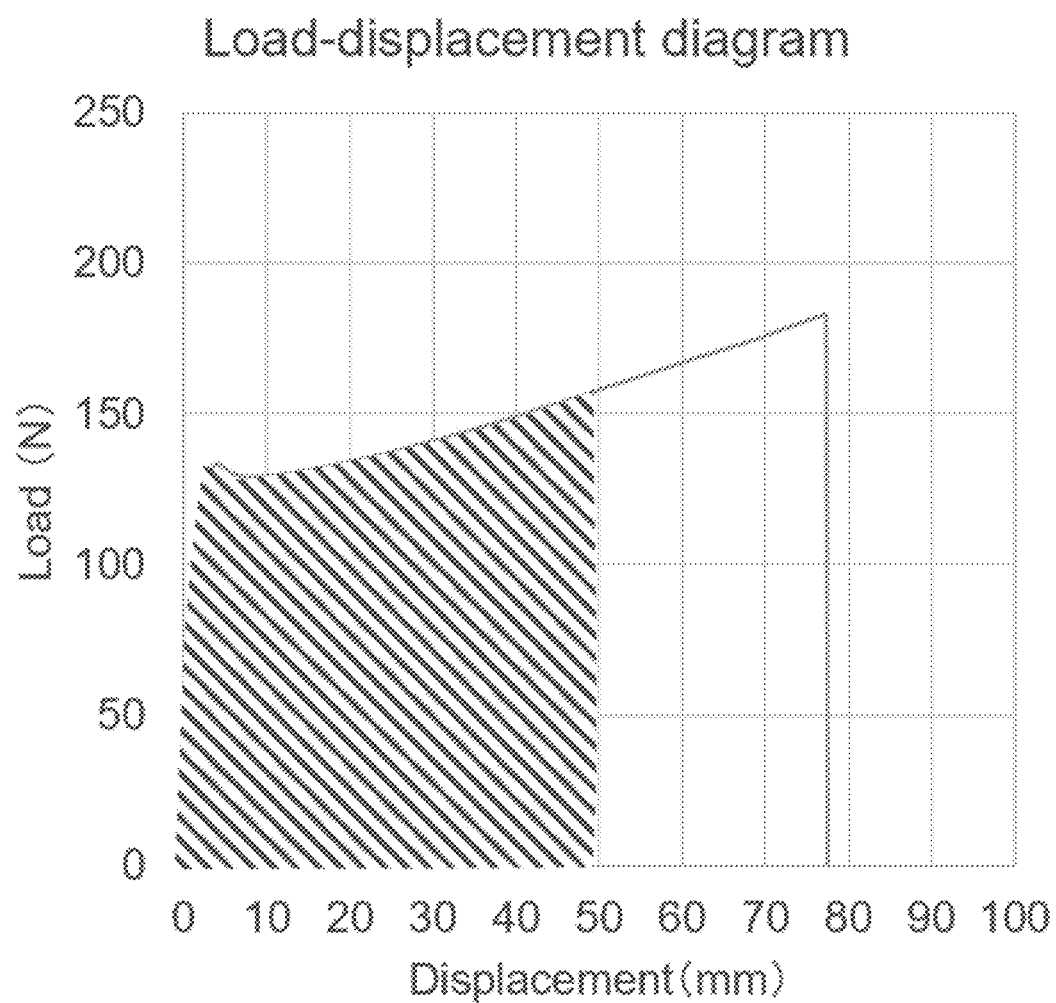

FIG. 1-3 is a schematic view showing the lamination structure of the laminate (30) according to the third embodiment of the present invention. The laminate (30) of the third embodiment is different from the laminate (10) of the first embodiment in that a layer E (15) composed of an adhesive is laminated on a surface opposite to a side on which the layer B (12) is laminated with respect to the layer C (14). The layer E (15) can function as a bonding layer when the laminate is attached to a structure.

The laminate (30) can be produced by carrying out the following steps after the above-mentioned steps 2-A.

Step 3-A: a step of forming the layer E (15) on a surface of the laminate (10) opposite to a side on which the layer B (12) is laminated with respect to the layer C (14).

In order to protect the layer E (15), before applying the laminate (30) to a structure, a separator (16) can also be attached to the surface opposite to the side on which the layer C (14) is laminated with respect to the layer E (15).

FIG. 1-4 is a schematic view showing the lamination structure of the laminate (40) according to the fourth embodiment of the present invention. The laminate (40) of the fourth embodiment is different from the laminate (20) of the second embodiment in that a layer E (15) composed of an adhesive is laminated on a surface opposite to a side on which the layer B (12) is laminated with respect to the layer C (14). The layer E (15) can function as a bonding layer when the laminate is attached to the structure.

The laminate (40) can be produced by carrying out the following steps after the above-mentioned step 2-C1 or step 2-C2.

Step 3-A: a step of forming the layer E (15) on a surface of the laminate (20) opposite to a side on which the layer B (12) is laminated with respect to the layer C (14).

Similar with the third embodiment, before applying the laminate (40) to a structure, a separator (16) can be attached to the surface opposite to the side on which the layer C (14) is laminated with respect to the layer E (15).

In any of the embodiments, the laminate can be provided, for example, in the form of a sheet (including a film).

When conducting an impact resistance test in which laminates having various lamination structures are attached to a structure such as a sound insulation wall, the present inventor has obtained an experimental result indicating that if the scattering rate of the structure was large in the impact resistance test and the fragments were scattered, the weight (iron ball) punched out the sound insulation wall regardless of the elongation or breakage of the laminate, and the displacement of the sound insulation wall to which the laminate is attached was over 50 mm, and the fragments scattered. On the other hand, an experimental result was also obtained that when the scattering rate in the impact resistance test was small and the scattering of fragments was prevented, the displacement of the structure to which the laminated body was attached was within 50 mm. From this result, the present inventor considered that the fracture energy needs to be absorbed when the displacement of the structure is within 0 mm to 50 mm.

After repeated diligent studies based on the above findings, it has been discovered that when a tensile property test method is carried out in accordance with JIS K7161-1994, which is an evaluation for a general sheet-shape laminate, under conditions of test speed: 200 mm/min, gauge length: 50 mm, and width of test piece: 10 mm, and a load-displacement diagram is obtained, and an integrated value (Nm) from 0 mm to 50 mm of displacement is calculated, if the integrated value is 1.0 Nm (=J) or more, the scattering rate in the impact resistance test of the structure becomes good.

Therefore, in any of the embodiments, in order to obtain excellent anti-scattering property, in the laminate, it is necessary that an integrated value from 0 mm to 50 mm of displacement calculated from a load-displacement diagram obtained by carrying out a tensile property test method in accordance with JIS K7161-1994 under conditions of test speed: 200 mm/min, gauge length: 50 mm, and width of test piece: 10 mm is 1.0 Nm (=J) or more. The integrated value is preferably 1.5 Nm or more, more preferably 2.0 Nm or more, and even more preferably 4.0 Nm or more. There is no particular upper limit to the integrated value, but it is usually 20.0 Nm or less, and typically 15.0 Nm or less. FIG. 3 shows an example of a load-displacement diagram. The above-mentioned integrated value corresponds to the area of the portion indicated by the diagonal line in the figure.

Further, it is considered that the adhesive strength between the layer B/layer C correlates with the scattering rate in the impact resistance test of the sound insulation wall. When the impact resistance test of the sound insulation wall was carried out, the scattering rate in the impact resistance test of the sound insulation wall was large, and when the fragments were scattered, the laminate was separated from the adherend. it was considered that when the laminate was separated from the adherend, the laminate cannot efficiently absorb the fracture energy, so the scattering rate was large, and the fragments were scattered. As a result of confirming the fragments and the separated laminate, it was confirmed that the separation occurred between the layer B/layer C of the sheet-shape laminate. On the other hand, when the scattering rate in the impact resistance test of the sound insulation wall was small and the scattering of debris was prevented, separation between the layer B/layer C did not occur. That is, a high adhesive strength between the layer B and the layer C significantly contributes to the reduction of the scattering rate of the sound insulation wall in the impact resistance test. Of course, the adhesive strength between the adherend and the laminate is also important, and it is also important that the laminate does not separate from the adherend due to the fracture energy.

Specifically, in any of the embodiments, in order to obtain excellent anti-scattering property, regardless of the presence or absence of the layer D, it is necessary that an adhesive strength between the layer B and the layer C measured in accordance with JIS Z0237-2009 (180° peeling adhesive strength measurement method) is 10 N/25 mm or more. The adhesive strength is preferably 12 N/25 mm or more, more preferably 13 N/25 mm or more, and even more preferably 15 N/25 mm or more. There is no particular upper limit to the adhesive strength, but it is usually 50 N/25 mm or less, and typically 30 N/25 mm or less.

In one embodiment, the laminate may have a total light transmittance measured according to a measurement method specified in JIS K7361-1-1997 of 90% or more (for example 90 to 99%). Further, in one embodiment, the laminate may have a HAZE measured according to a measurement method specified in JIS K7136-2000 of 60% or less. The HAZE may be 50% or less, 40% or less, 30% or less, 20% or less, or even 10% or less. For example, it may be in the range of 0.1 to 60%. Since total light transmittance and HAZE are parameters related to transparency, showing high total light transmittance and low HAZE means that the laminate has high transparency. As a result, deterioration of the structure can be visually confirmed even after the laminated body is attached, so that the laminate is advantageous for carrying out deterioration prediction and maintenance work. Further, the translucency can be maintained even when the laminate is attached to the light transmissive structure.

<1-1. Layer A>

In one embodiment, the layer A is a layer composed of a resin composition comprising 50 parts by mass or more and 100 parts by mass or less of a polyvinylidene fluoride-based resin, and 0 parts by mass or more and 50 parts by mass or less of a poly (meth) acrylic acid ester-based resin (assuming a total of both being 100 parts by mass). With respect to a total of both being 100 parts by mass, the mixing ratio of the polyvinylidene fluoride-based resin and the poly (meth) acrylic acid ester-based resin in the layer A is preferably: polyvinylidene fluoride-based resin:poly (meth) acrylic acid ester-based resin=95 to 55 parts by mass: 5 to 45 parts by mass, and more preferably 85 to 60 parts by mass: 15 to 40 parts by mass. With respect to a total of 100 parts by mass of the polyvinylidene fluoride-based resin and the poly (meth) acrylic acid ester-based resin, when the polyvinylidene fluoride-based resin is 50 parts by mass or more, the characteristics such as weather resistance and stain resistance possessed by the polyvinylidene fluoride-based resin can be improved. Further, by containing a small amount of poly (meth) acrylic acid ester-based resin in the layer A, the adhesiveness and adhesion to the layer B can be improved.

In the layer A, in addition to polyvinylidene fluoride-based resin and poly (meth) acrylic acid ester-based resin, as long as the object of the present invention is not impaired, other resins, plasticizers, heat stabilizers, antioxidants, light stabilizers, crystal nucleating agents, blocking inhibitors, sealability improvers, mold release agents, colorants, pigments, foaming agents, flame retardants and the like may be appropriately contained. However, in general, the total content of the polyvinylidene fluoride-based resin and the poly (meth) acrylic acid ester-based resin in the layer A is 80% by mass or more, typically 90% by mass or more, more typically 95% by mass or more, and may be 100% by mass. The layer A may be formed of a single layer or a plurality of layers. Further, although an ultraviolet absorber may be contained in the layer A, it is preferable not to contain it from the viewpoint of cost and bleed-out.

In the present invention, the polyvinylidene fluoride-based resin refers to a homopolymer of vinylidene fluoride, as well as a copolymer of vinylidene fluoride and a monomer which is copolymerizable with vinylidene fluoride. Examples of monomer which is copolymerizable with vinylidene fluoride include: vinyl fluoride, ethylene tetrafluoroethylene, propylene hexafluoride, isobutylene hexafluoride, ethylene trifluoride, various alkyl vinyl fluoride ethers, and further publicly known vinyl monomers such as styrene, ethylene, butadiene, and propylene. Among these, at least one selected from the group consisting of vinyl fluoride, ethylene tetrafluoroethylene, propylene hexafluoride and ethylene trifluoride is preferable, and propylene hexafluoride is more preferable.

Examples of the polymerization reaction for obtaining a polyvinylidene fluoride-based resin include publicly known polymerization reactions such as radical polymerization and anionic polymerization. In addition, examples of the polymerization method include publicly known polymerization methods such as suspension polymerization and emulsion polymerization. The crystallinity, mechanical properties, and the like of the obtained resin change depending on the polymerization reaction and the polymerization method.

The melting point of the polyvinylidene fluoride-based resin is preferably 150° C. or higher, more preferably 160° C. or higher. The upper limit of the melting point of the polyvinylidene fluoride-based resin is preferably 170° C., which is equal to the melting point of polyvinylidene fluoride (PVDF).

The melting point of the polyvinylidene fluoride-based resin can be measured by heat flux differential scanning calorimetry (heat flux DSC). For example, it can be obtained by using a differential scanning calorimetry device DSC3100SA manufactured by Bruker AXS Co., Ltd., and calculating from the DSC curve (first run) obtained when the sample is heated from room temperature to 200° C. at a sample mass of 1.5 mg and a heating rate of 10° C./min.

The MFR of the polyvinylidene fluoride-based resin is preferably 5 to 50 g/10 minutes under measurement conditions at 230° C. and 3.8 kg load in accordance with ISO1133. The higher the MFR is, the higher the fluidity during melt extrusion is, so the formability tends to improve, and the lower the MFR is, the higher the impact strength of the laminated sheet tends to be. From the viewpoint of achieving both strength and formability, the MFR is more preferably 5 to 30 g/10 minutes, further preferably 10 to 30 g/10 minutes, and particularly preferably 15 to 26 g/10 minutes.

The lower limit of the weight average molecular weight (Mw) of the polyvinylidene fluoride-based resin is preferably 40,000 or more, more preferably 50,000 or more, and even more preferably 60,000 or more. The upper limit of the weight average molecular weight (Mw) of the polyvinylidene fluoride-based resin is preferably 1,000,000 or less, more preferably 500,000 or less, and even more preferably 350,000 or less. The higher the weight average molecular weight (Mw) is, the higher the impact strength of the laminated sheet tends to be, and the lower the weight average molecular weight (Mw) is, the higher the fluidity during melt extrusion is, and therefore the higher the formability tends to be. From the viewpoint of achieving both strength and formability, the weight average molecular weight (Mw) is preferably 40,000 to 1,000,000, more preferably 50,000 to 500,000, and even more preferably 60,000 to 350,000.

The lower limit of the dispersity (Mw/Mn, where Mn is the number average molecular weight) of the polyvinylidene fluoride-based resin is preferably 1.0 or more, more preferably 1.5 or more, and even more preferably 2.0 or more. The upper limit of the dispersity (Mw/Mn) of the polyvinylidene fluoride-based resin is preferably 4.0 or less, more preferably 3.5 or less, and even more preferably 3.0 or less. The larger the dispersity (Mw/Mn) is, the more the thickness accuracy of the laminate tends to improve, and the smaller the dispersity (Mw/Mn) is, the better the fluidity during melt extrusion is, and thus the better the formability tends to be. From the viewpoint of achieving both thickness accuracy and formability, the dispersity (Mw/Mn) is preferably 1.0 to 4.0, more preferably 1.5 to 3.5, and even more preferably 2.0 to 3.0.

The weight average molecular weight (Mw), number average molecular weight (Mn), and dispersity (Mw/Mn) of the polyvinylidene fluoride-based resin can be measured by gel permeation chromatography (GPC). For example, N, N'-dimethylformamide containing 10 mmol/L lithium bromide can be used as an eluent, and polyethylene oxide, polyethylene glycol, and tetraethylene glycol can be used as standard substances for the measurement.

In the present invention, the poly (meth) acrylic acid ester-based resin refers to a homopolymer of (meth) acrylic acid ester such as methyl acrylate or methyl methacrylate, and a copolymer of (meth) acrylic acid ester and a monomer which is copolymerizable with (meth) acrylic acid ester. Examples of monomer which is copolymerizable with (meth) acrylic acid ester include: (meta) acrylic esters such as butyl (meth) acrylate and ethyl (meth) acrylate; aromatic vinyl monomers such as styrene, α-methylstyrene, p-methylstyrene, o-methylstyrene, t-butylstyrene, divinylbenzene, tristyrene, and the like; vinyl cyanide monomers such as acrylonitrile and methacrylonitrile; glycidyl group-containing monomers such as glycidyl (meth) acrylate; vinyl carboxylate-based monomers such as vinyl acetate and vinyl butyrate; olefin-based monomers such as ethylene, propylene and isobutylene; diene-based monomers such as 1,3-butadiene and isoprene; unsaturated carboxylic acid-based monomers such as maleic acid, maleic anhydride, and (meth) acrylic acid; enone-based monomers such as vinyl methyl ketone, and the like. Among these, one type may be used alone, or two or more types may be used in combination. Among these, because of compatibility with polyvinylidene fluoride-based resins, the strength of the laminate, and the adhesiveness and adhesion to the layer B, homopolymers of methyl (meth) acrylate, or an acrylic rubber-modified acrylic copolymer obtained by copolymerizing a monomer mainly composed of methyl (meth) acrylate with an acrylic rubber mainly composed of butyl (meth) acrylate is preferable.

Examples of the copolymer include random copolymers, graft copolymers, block copolymers (for example, linear types such as diblock copolymers, triblock copolymers, and gradient copolymers, and star-shaped copolymers polymerized by the arm-first method or the core-first method), and copolymers obtained by polymerization using a macromonomer which is a polymer compound having a polymerizable functional group (macromonomer copolymer), and a mixture thereof. Among these, graft copolymers and block copolymers are preferable from the viewpoint of resin productivity.

Examples of the polymerization reaction for obtaining a poly (meth) acrylic acid ester-based resin include publicly known polymerization reactions such as radical polymerization, living radical polymerization, living anionic polymerization, and living cationic polymerization. Moreover, as a polymerization method, a publicly known polymerization method such as bulk polymerization, suspension polymerization, emulsion polymerization, solution polymerization and the like can be mentioned. The mechanical properties of the obtained resin change depending on the polymerization reaction and the polymerization method.

The MFR of the poly (meth) acrylic acid ester-based resin is preferably 2 to 30 g/10 minutes under measurement conditions at 230° C. and 10 kg load in accordance with ISO1133. The higher the MFR is, the higher the fluidity during melt extrusion is, so the formability tends to improve, and the lower the MFR is, the higher the impact strength of the laminated sheet tends to be. From the viewpoint of achieving both strength and formability, the MFR is more preferably 3 to 20 g/10 minutes, further preferably 4 to 15 g/10 minutes, and particularly preferably 5 to 10 g/10 minutes.

The lower limit of the weight average molecular weight (Mw) of the poly (meth) acrylic acid ester-based resin is preferably 50,000 or more, more preferably 70,000 or more, and even more preferably 100,000 or more. The upper limit of the weight average molecular weight (Mw) of the poly (meth) acrylic acid ester-based resin is preferably 1,000,000 or less, more preferably 750,000 or less, and even more preferably 500,000 or less. The higher the weight average molecular weight (Mw) is, the more preferable it is to maintain the impact strength of the laminate, and the lower the weight average molecular weight (Mw) is, the higher the fluidity during melt extrusion is, and therefore the higher the formability tends to be. From the viewpoint of achieving both strength and formability, the weight average molecular weight (Mw) is preferably 50,000 to 1,000,000, more preferably 70,000 to 750,000, and even more preferably 100,000 to 500,000.

The lower limit of the dispersity (Mw/Mn, where Mn is the number average molecular weight) of the poly (meth) acrylic acid ester-based resin is preferably 1.0 or more, more preferably 1.5 or more, and even more preferably 2.0 or more. The upper limit of the dispersity (Mw/Mn) of the poly (meth) acrylic acid ester-based resin is preferably 4.0 or less, more preferably 3.5 or less, and even more preferably 3.0 or less. The larger the dispersity (Mw/Mn) is, the more the thickness accuracy of the laminate tends to improve, and the smaller the dispersity (Mw/Mn) is, the better the fluidity during melt extrusion is, and thus the better the formability tends to be. From the viewpoint of achieving both thickness accuracy and formability, the dispersity (Mw/Mn) is preferably 1.0 to 4.0, more preferably 1.5 to 3.5, and even more preferably 2.0 to 3.0.

The weight average molecular weight (Mw), number average molecular weight (Mn), and dispersity (Mw/Mn) of the poly (meth) acrylic acid ester-based resin can be measured by gel permeation chromatography (GPC). For example, Tetrahydrofuran can be used as an eluent and polystyrene can be used as a standard substance for the measurement.

In an acrylic rubber-modified acrylic copolymer, the volume medium particle size of the rubber-like dispersed particles forming the dispersed phase is preferably 5.0 μm or less. The larger the volume medium particle diameter is, the more dominant the impact strength of the laminate becomes, and the smaller the volume is, the more dominant the transparency becomes. From the viewpoint of achieving both strength and transparency, the volume medium particle size is preferably 0.05 to 3.0 μm, more preferably 0.1 to 2.0 μm, and particularly preferably 0.5 to 1.5 μm.

As a method of adjusting the volume medium particle diameter of the rubber-like dispersed particles, a method of adjusting the stirring speed in the phase transition region of the rubber particles in the polymerization step, a method of adjusting the amount of the chain transfer agent in the raw material liquid, and the like can be mentioned.

For the volume medium particle size of the rubber-like dispersed particles, for example, an acrylic rubber-modified acrylic copolymer is dissolved in an electrolytic solution (3% tetra-n-butylammonium/97% dimethylformamide solution), and a coulter multisizer method (Multisizer II manufactured by Coulter Co., Ltd.; Orifice diameter of aperture tube: 30 μm) is carried out to obtain a volume-based cumulative particle size distribution curve, and the 50% by volume particle size can be adopted.

The thickness of the layer A is preferably 5 to 100 μm, more preferably 5 to 80 μm, and even more preferably 10 to 60 μm. When the layer A is 5 μm or more, the function as a protective layer can be improved, and when the layer A is 100 μm or less, cost reduction can be realized. The layer A may be formed of a single layer or a plurality of layers, but it is desirable that the total thickness is within the above-mentioned thickness.

The surface of the layer A on the side where the layer B is laminated may be subjected to a surface treatment such as corona discharge treatment, plasma treatment (atmospheric pressure and vacuum), high frequency sputtering etching treatment, frame treatment, ITRO treatment, excimer UV treatment, and primer treatment, in order to increase the adhesive strength between the layer A and the layer B. Further, a roughening treatment such as physically scraping the surface may be performed by sandpaper, Keren, blasting or the like. Examples of the primer include acrylic-based, ethylene vinyl acetate-based, urethane-based and epoxy-based primers, but acrylic-based primer is preferable from the viewpoint of increasing the adhesive strength with the layer B.

As to the surface of the layer A on the side where the layer B is not laminated, when applying the laminate over a large area, there is a possibility that it will be overlapped. Therefore, in order to increase the adhesive strength between laminated sheets, it may be subjected to a surface treatment such as corona discharge treatment, plasma treatment (atmospheric pressure and vacuum), high frequency sputtering etching treatment, frame treatment, ITRO treatment, excimer UV treatment, and primer treatment, in order to increase the adhesive strength between the laminate sheets. Further, a roughening treatment such as physically scraping the surface may be performed by sandpaper, Keren, blasting or the like. Examples of the primer include acrylic-based, ethylene vinyl acetate-based, urethane-based and epoxy-based primers, but acrylic-based primer is preferable from the viewpoint of increasing the adhesive strength between the laminated sheets.

<1-2. Layer B>

In one embodiment, the layer B is a layer composed of a resin composition comprising 0 parts by mass or more and less than 50 parts by mass of a polyvinylidene fluoride-based resin and more than 50 parts by mass and 100 parts by mass or less of a poly (meth) acrylic acid ester-based resin (assuming a total of both being 100 parts by mass). With respect to a total of both being 100 parts by mass, the mixing ratio of the polyvinylidene fluoride-based resin and the poly (meth) acrylic acid ester-based resin in the layer A is preferably: polyvinylidene fluoride-based resin:poly (meth) acrylic acid ester-based resin=5 to 45 parts by mass: 95 to 55 parts by mass, and more preferably 15 to 40 parts by mass: 85 to 60 parts by mass. With respect to a total of 100 parts by mass of the polyvinylidene fluoride-based resin and the poly (meth) acrylic acid ester-based resin, when the poly (meth) acrylic acid ester-based resin is more than 50 parts by mass, the adhesion to the layer C or the layer D can be improved. Further, by containing a small amount of polyvinylidene fluoride-based resin in the layer B, weather resistance, the adhesiveness and adhesion to the layer A can be improved.

In the layer B, in addition to polyvinylidene fluoride-based resin and poly (meth) acrylic acid ester-based resin, as long as the object of the present invention is not impaired, other resins, plasticizers, heat stabilizers, antioxidants, light stabilizers, crystal nucleating agents, blocking inhibitors, sealability improvers, mold release agents, colorants, pigments, foaming agents, flame retardants and the like may be appropriately contained. However, in general, the total content of the polyvinylidene fluoride-based resin and the poly (meth) acrylic acid ester-based resin in the layer B is 80% by mass or more, typically 90% by mass or more, more typically 95% by mass or more, and may be 100% by mass.

The layer B preferably comprises an ultraviolet absorber. When the layer B contains an ultraviolet absorber, ultraviolet rays are blocked and weather resistance can be effectively enhanced. Examples of the ultraviolet absorber include, but are not limited to, hydroquinone-based, triazine-based, benzotriazole-based, benzophenone-based, cyanoacrylate-based, oxalic acid-based, hindered amine-based, and salicylic acid derivatives. These can be used alone or in combination of two or more. Among these, benzotriazole-based and triazine-based compounds are preferable because of their long-lasting UV blocking effect. The content of the ultraviolet absorber in the layer B is preferably 0.05 to 15 parts by mass with respect to 100 parts by mass in total of the polyvinylidene fluoride-based resin and the poly (meth) acrylic acid ester-based resin of the layer B. By setting the content of the ultraviolet absorber in the layer B to 0.05 parts by mass or more, preferably 1 part by mass or more, and more preferably 2 parts by mass or more with respect to 100 parts by mass in total of the polyvinylidene fluoride-based resin and the poly (meth) acrylic acid ester-based resin, further improvement of weather resistance, as well as ultraviolet absorption effect, and deterioration suppression effect of the layer C, the layer D, the layer E, and the adherend by imparting UV blocking property can be expected. Further, By setting the content of the ultraviolet absorber in the layer B to 15 parts by mass or less, preferably 10 part by mass or less, and more preferably 5 parts by mass or less with respect to 100 parts by mass in total of the polyvinylidene fluoride-based resin and the poly (meth) acrylic acid ester-based resin, it is possible to prevent the ultraviolet absorber from bleeding out to the surface of the laminate, prevent deterioration of adhesion to the resin layer having a scattering prevention function, and realize cost reduction.

The thickness of the layer B is preferably 5 to 100 μm, more preferably 10 to 100 μm, and even more preferably 13 to 80 μm. When the layer B is 5 μm or more, the adhesion to the layer C or the layer D can be improved, and when the layer B is 100 μm or less, cost reduction can be realized. The layer B may be formed of a single layer or a plurality of layers, but it is desirable that the total thickness is within the above-mentioned thickness.

<1-3. Layer C>

In one embodiment, the layer C is a layer composed of a resin or a resin composition that exhibits ductile fracture and has a yield point. When the layer C has such characteristics, the impact resistance of the structure when the laminated body is attached to the structure can be significantly improved, and as a result, it is possible to significantly improve the anti-scattering property.

More specifically, it is considered that when the layer C exhibits ductile fracture, the fracture energy changes to the elongation of the laminate, and the above-mentioned integral value (Nm) from 0 mm to 50 mm of displacement becomes large, and as a result of efficiently absorbing the fracture energy, the anti-scattering property is improved. Further, it is considered that the above-mentioned integrated value (Nm) from 0 mm to 50 mm of the displacement tends to be larger when the layer C shows a yield point, and as a result of efficiently absorbing the fracture energy, the anti-scattering property is improved. It is considered that the anti-scattering property is exhibited by achieving both of these. On the other hand, in a laminated body having no yield point and having good elongation, it is considered that the fracture energy immediately changes to elongation and no yield point is shown, so that the integrated value (Nm) from 0 mm to 50 mm of displacement is not likely to become large, and it is difficult to obtain the anti-scattering property.

In the present invention, a layer composed of a resin or a resin composition that exhibits ductile fracture refers to a layer that breaks after plastic deformation with constriction (necking) when carrying out a tensile property test method in accordance with JIS K7161-1994 under conditions of test speed: 200 mm/min, gauge length: 50 mm, and width of test piece: 10 mm. For example, the curves b, c, and d in FIG. 1 (typical stress-strain curve) of JIS K7161-1994 are applicable. When it is difficult to take out the layer C from the laminate and carry out the test, a test method for the tensile properties may be carried out on a resin or resin composition having the same specifications as the layer C to investigate the presence or absence of ductile fracture.

In the present invention, a layer composed of a resin or a resin composition that has a yield point refers to a layer having one or more yield points between 0 and 100% nominal tensile strain (elongation) when carrying out a tensile property test method in accordance with JIS K7161-1994 under conditions of test speed: 200 mm/min, gauge length: 50 mm, and width of test piece: 10 mm. For example, the curves b and c in FIG. 1 (typical stress-strain curve) of JIS K7161-1994 are applicable. For example, the curves b, c, and d in FIG. 1 (typical stress-strain curve) of JIS K7161-1994 are applicable. When it is difficult to take out the layer C from the laminate and carry out the test, a test method for the tensile properties may be carried out on a resin or resin composition having the same specifications as the layer C to investigate the presence or absence of yield points.

It is preferable that the layer C has a nominal tensile strain (elongation) of 100% or more when carrying out a tensile property test method in accordance with JIS K7161-1994 under conditions of test speed: 200 mm/min, gauge length: 50 mm, and width of test piece: 10 mm. From the viewpoint of the strength of the layer C and the anti-scattering property of the laminated body, the nominal tensile strain (elongation) is more preferably 120% or more, and even more preferably 150% or more. There is no particular upper limit to the nominal tensile strain (elongation), but when the value of the nominal tensile strain (elongation) becomes large, the viscosity of the layer C becomes dominant, the tensile yield stress of the laminate decreases, and the integrated value from 0 mm to 50 mm of displacement calculated from the load-displacement diagram of the laminated body becomes small, which suggests that the strength of the layer C and the anti-scattering property of the laminate may decrease. Therefore, the nominal tensile strain (elongation) is more preferably 300% or less, and even more preferably 200% or less. When it is difficult to take out the layer C from the laminate and carry out the test, a test method for the tensile properties may be carried out on a resin or resin composition having the same specifications as the layer C to investigate the nominal tensile strain (elongation).

Examples of the resin or the resin composition that exhibits ductile fracture and has a yield point include, but are not limited to, a resin or resin composition comprising one or more selected from the group consisting of polycarbonate-based resin (PC resin), polyamide-based resin, polyethylene terephthalate-based resin, polyvinyl chloride-based resin, and acrylonitrile-butadiene-styrene copolymer (ABS resin). Among these, a polyamide-based resin, a polyethylene terephthalate-based resin, a polyvinyl chloride-based resin, and a PC/ABS resin in which a PC resin and an ABS resin are blended are preferable from the viewpoint of improving the anti-scattering property because both the nominal tensile strain (elongation) and the tensile yield stress are high, and the integrated value from 0 mm to 50 mm of displacement calculated from the load-displacement diagram of the laminated body tends to be high.

The layer C is preferably biaxially oriented. As a result, the strength of the layer C can be increased, and the scattering prevention performance can be enhanced. Examples of the biaxial stretching process include an inflation method, a sequential biaxial stretching process, and a simultaneous biaxial stretching process.

In order to increase the impact strength and enhance the anti-scattering performance, the thickness of the layer C is preferably 15 μm or more, more preferably 20 μm or more, even more preferably 50 μm or more, even more preferably 70 μm or more, even more preferably 80 μm or more, and even more preferably 100 μm or more. From the viewpoint of handling and cost, the thickness of the layer C is preferably 1,500 μm or less, more preferably 1,000 μm or less, and even more preferably 500 μm or less. The layer C may be formed of a single layer or a plurality of layers, but it is desirable that the total thickness is within the above-mentioned thickness.

Polycarbonate-based resins are resins in which carbonate groups are mainly responsible for bonding the monomers. Examples of the polycarbonate-based resin include those obtained by reacting one or more kinds of bisphenols with phosgene or carbonic acid diester, or those obtained by reacting one or more kinds of bisphenols with diphenyl carbonates by a transesterification method. Examples of bisphenols include, for example, bis-(4-hydroxyphenyl)-alkane represented by bisphenol A, and further bis-(4-hydroxyphenyl)-cycloalkane, bis-(4-hydroxyphenyl)-sulfide, bis-(4-hydroxyphenyl)-ether, bis-(4-hydroxyphenyl)-ketone, bis-(4-hydroxyphenyl)-sulfone, bisphenol fluorene, and the like. Further, for the purpose of improving processing characteristics and the like, a compound obtained by copolymerizing copolymers of hydroquinone as a divalent phenol other than bisphenols and a compound such as 4,4-dihydroxybiphenyl as a copolymer is also preferably used. As the polycarbonate-based resin, one type may be used alone, or two or more types may be used in combination.

Polyamide-based resins are resins in which amide groups are mainly responsible for bonding the monomers. As the polyamide-based resin, any of an aliphatic polyamide resin, an alicyclic polyamide resin and an aromatic polyamide resin can be used. Examples of the aliphatic polyamide include polyamide 46, polyamide 6, polyamide 66, polyamide 610, polyamide 612, polyamide 9, polyamide 11, polyamide 12, polyamide 6/66, and polyamide 66/610, and the like. Examples of the alicyclic polyamide include poly-1,4-norbornene terephthalamide, poly-1,4-cyclohexane terephthalamide, and poly-1,4-cyclohexane-1,4-cyclohexaneamide. Examples of the aromatic polyamide include polyamide 4T, polyamide 5T, polyamide M-5T, polyamide 6T, polyamide 9T, polyamide 10T, polyamide 11T, polyamide 12T, polyamide MXD6, polyamide PXD6, polyamide MXD10, polyamide PXD6, polyamide 6I, polyamide PACMT, Examples thereof include polyamide PACMI, polyamide PACM12, and polyamide PACM14, and the like. As the polyamide-based resin, one type may be used alone, or two or more types may be used in combination.

Polyethylene terephthalate-based resin is a resin whose main components of the monomer contain terephthalic acid as a dicarboxylic acid component and ethylene glycol as a diol component. Other comonomer components may be copolymerized in order to suppress crystallization during molding, improve processability, and the like. Specific examples of the comonomer component include isophthalic acid, sebacic acid, adipic acid, azelaic acid and the like as the dicarboxylic acid component, and specific examples of the diol component include diethylene glycol, neopentyl glycol, 1,4-cyclohexanedimethanol, butanediol and the like. As the polyethylene terephthalate-based resin, one type may be used alone, or two or more types may be used in combination.

Examples of polyvinyl chloride-based resin include polyvinyl chloride, as well as chlorinated polyethylene, and resins obtained by copolymerizing vinyl chloride and a comonomer component (example: vinyl chloride-vinyl acetate copolymer, vinyl chloride-ethylene copolymer, and vinyl chloride-propylene copolymer). As the polyvinyl chloride-based resin, one type may be used alone, or two or more types may be used in combination.

Acrylonitrile-butadiene-styrene copolymer (ABS resin) is a general term for resins obtained by copolymerizing acrylonitrile, butadiene, and styrene as raw material monomers, and any ratio of each component may be used. The raw material monomers used for ABS resin include those containing monomers such as α-methylstyrene, vinyltoluene, dimethylstyrene, chlorostyrene, and vinylnaphthalene in addition to or in place of styrene. Also included are those containing monomers such as methacrylonitrile, etacrylonitrile, and fumaronitrile in addition to or in place of acrylonitrile. Further, in addition to or in place of butadiene, those containing monomers such as acrylic rubber mainly composed of butyl (meth) acrylate, chlorinated polyethylene, and ethylene-propylene-diene rubber (EPDM) which is an ethylene rubber, are also included. Therefore, in the present specification, the ABS resin is a concept including AES resin, ASA resin, ACS resin and the like.

Any method can be selected as the polymerization method of the acrylonitrile-butadiene-styrene copolymer (ABS resin). As a method for manufacturing the ABS resin, a graft copolymerization method in which an acrylonitrile-styrene copolymer is grafted on polybutadiene is generally used, but for example, an ABS resin polymerized by an emulsification graft method, a massive polymerization method, a polymer blending method or the like may be used.

In the emulsification graft method, acrylonitrile, latex, styrene, a catalyst and an emulsifier are polymerized in a polymerization reactor, and water and the like are removed by a centrifuge, and then palletization is performed by an extruder. In the massive polymerization method, each component is polymerized using a polymerization reaction tank, and unpolymerized monomers are recovered, and then palletization is performed by an extruder. In the polymer blending method, rubber and additives are added to AS resin, compounded with a mixer, and then palletization is performed by an extruder. A method of producing an ABS resin having an extremely high butadiene ratio by a graft method and compounding it with the AS resin is also one of the methods.

As the ABS resin, any resin containing ABS resin as a main component, for example, an ABS resin blend, an ABS resin alloy, or the like can be used. Examples of such a resin include a PC/ABS resin in which a PC resin and an ABS resin are blended. Further, a styrene-N-phenylmaleimide-maleic anhydride copolymer may be blended for the purpose of improving the heat resistance of the ABS resin and improving the compatibility of the PC/ABS resin blend and the polyamide/ABS resin blend.

The layer C may appropriately contain other resins, plasticizers, heat stabilizers, antioxidants, light stabilizers, UV absorbers, crystal nucleating agents, blocking inhibitors, sealing improvers, mold release agents, colorants, pigments, foaming agents, flame retardants and the like, as long as the object of the present invention is not impaired. However, in general, the total content of the polycarbonate-based resin, the polyamide-based resin, the polyethylene terephthalate-based resin, the polyvinyl chloride-based resin, and the acrylonitrile-butadiene-styrene copolymer (ABS resin) in the layer C is 80% mass by mass or more, typically 90% by mass or more, more typically 95% by mass or more, and may be 100% by mass.

Regardless of the presence or absence of the layer D, in order to increase the adhesive strength between the layer B and the layer C, the surface of the side on which the layer B is laminated with respect to the layer C may be subjected to a surface treatment such as corona discharge treatment, plasma treatment (atmospheric pressure and vacuum), high frequency sputtering etching treatment, frame treatment, ITRO treatment, excimer UV treatment, and primer treatment. Further, a roughening treatment such as physically scraping the surface may be performed by sandpaper, Keren, blasting or the like. Examples of the primer include acrylic-based, ethylene vinyl acetate-based, urethane-based and epoxy-based primers, but acrylic-based primer is preferable from the viewpoint of increasing the adhesive strength with the layer B.

Further, If the layer E is present, in order to increase the adhesive strength between the layer C and the layer E, the surface of the side on which the layer E is laminated with respect to the layer C may be subjected to a surface treatment such as corona discharge treatment, plasma treatment (atmospheric pressure and vacuum), high frequency sputtering etching treatment, frame treatment, ITRO treatment, excimer UV treatment, and primer treatment. Further, a roughening treatment such as physically scraping the surface may be performed by sandpaper, Keren, blasting or the like. Examples of the primer include acrylic-based, ethylene vinyl acetate-based, urethane-based and epoxy-based primers, but acrylic-based primer is preferable from the viewpoint of increasing the adhesive strength with the layer E.

<1-4. Layer D>

The layer D is composed of an adhesive, and when the adhesive strength between the layer B and the layer C is low, the adhesive strength between the two can be increased. In the present invention, the adhesive refers to a pressure sensitive adhesive, a reactive adhesive, or a mixture of both. In the present invention, a pressure sensitive adhesive is different from a reactive adhesive in that a pressure sensitive adhesive is a soft gel-like solid from the time of bonding, and wets and spreads on the adherend as it is, and after that, it does not change its state and exerts a force to resist peeling. In other words, a pressure sensitive adhesive develops an adhesive force that can withstand practical use as soon as it is attached. On the other hand, when a reactive adhesive is bonded, it is a fluid liquid that wets and spreads on the bonding interface, then changes to a solid by a chemical reaction, and is firmly bonded at the interface, and thus exerting a force to resist peeling. After a reactive adhesive is attached, it takes time for the adhesive to solidify by a chemical reaction before it develops adhesive strength that can withstand practical use. The type of adhesive used for the layer D may be appropriately determined depending on the materials of the layer B and the layer C.

The thickness of the layer D is not particularly limited. Generally, as the thickness of the adhesive layer becomes smaller, the adhesiveness to the adherend tends to decrease. Therefore, for example, the thickness is preferably 5 µm or more, more preferably 10 µm or more, even more preferably 15 µm or more, and particularly preferably 20 µm or more. When the thickness of the layer D exceeds 150 µm, various performances caused by the layer D tend to reach a plateau, and the cost becomes high. Therefore, the thickness is preferably 150 µm or less, more preferably 110 µm or less, even more preferably 100 µm or less, and particularly preferably 75 µm or less. From these viewpoints, the thickness of the layer D is preferably 5 to 150 µm, more preferably 10 to 110 µm, even more preferably 15 to 100 µm, and particularly preferably 20 to 75 µm. The thickness refers to the thickness (µm/Dry) after the layer D is dried or after the reaction.

Examples of the pressure sensitive adhesive include rubber pressure sensitive adhesives, (meth) acrylic-based pressure sensitive adhesives, silicone-based pressure sensitive adhesives, urethane-based pressure sensitive adhesives, vinyl alkyl ether-based pressure sensitive adhesives, polyvinyl alcohol-based pressure sensitive adhesives, polyvinylpyrrolidone-based pressure sensitive adhesives, poly acrylamide-based pressure-sensitive adhesives, and cellulose-based pressure-sensitive adhesives. As the pressure sensitive adhesive, one type may be used alone, or two or more types may be used as a mixture.

Pressure sensitive adhesives can be classified into hot melt pressure sensitive adhesives, two-component mixing type pressure sensitive adhesives, thermosetting pressure sensitive adhesives, UV curable pressure sensitive adhesives, and the like. when classified by adhesive form. Among these, a two-component mixing type pressure sensitive adhesive is preferably available because of its ease of handling and stable adhesive strength development.

Among these, the two-component mixing type (meth) acrylic pressure sensitive adhesive may be preferably used from the viewpoint of being transparent and having excellent adhesiveness. (Meta) acrylic means both acrylic and methacrylic. Details of (meth) acrylic pressure sensitive adhesives that may be preferably used in the present invention are described in WO 2016/010013.

As specific examples of the (meth) acrylic pressure sensitive adhesive, copolymers of at least one (monomer A) of C2-C12 alkyl esters of (meth) acrylic acid (for example, ethyl (meth) acrylate, n-propyl (meth) acrylate, n-butyl (meth) acrylate, isobutyl (meth) acrylate, n-pentyl (meth) acrylate, 2-methylbutyl (meth) acrylate, n-hexyl (Meta) acrylate, 2-ethylhexyl (meth) acrylate, n-octyl (meth) acrylate, isooctyl (meth) acrylate, n-nonyl (meth) acrylate, isononyl (meth) acrylate) and at least one (monomer B) of a functional group-containing acrylic monomer (for example, acrylic acid, methacrylic acid, acrylamide, N-methylolacrylamide, 2-hydroxyethyl acrylate, 2-hydroxyethyl methacrylate). The copolymerization ratio of the monomer A and the monomer B is in the range of the monomer A/monomer B=99.9/0.1 to 70/30, preferably 99/1 to 75/25 as a mass ratio with respect to 100 parts by mass of the total of the monomer A and the monomer B.

Particularly suitable (meth) acrylic copolymers include copolymers of butyl acrylate (BA) and acrylic acid (AA). In this case, the copolymerization ratio of butyl acrylate (BA) and acrylic acid (AA) is in the range of BA/AA=99.9/0.1 to 70/30, preferably 99.5/0.5 to 80/20 as a mass ratio with respect to 100 parts by mass of the total of BA and AA. With respect to 100 parts by mass in total of BA and AA, when AA is 0.1 part by mass or more, it becomes easy to control the adhesive physical properties by using a cross-linking agent in combination. Further With respect to 100 parts by mass in total of BA and AA, when AA is 30 parts by mass or less, the glass transition point (Tg) is lowered, the adhesion to the structure at a low temperature is improved, and the workability is also improved.

The weight average molecular weight (Mw) of the (meth) acrylic copolymer is preferably 200,000 to 1,000,000, more preferably 400,000 to 800,000. Such molecular weight can be adjusted by the amount of the polymerization initiator and by adding a chain transfer agent. When the weight average molecular weight (Mw) is 200,000 or more, the cohesive force of the (meth) acrylic copolymer is improved, and it is possible to prevent adhesive residue on the structure and separation of the adhesive sheet. Further, when the weight average molecular weight (Mw) is 1,000,000 or less, the (meth) acrylic copolymer has appropriate flexibility, and the followability to the unevenness of the structure is improved.

Additives such as a cross-linking agent, a tackifier, an ultraviolet absorber, and a light stabilizer can be added to the pressure sensitive adhesive, if necessary.

Examples of the cross-linking agent include isocyanate-based cross-linking agents, epoxy-based cross-linking agents, and amine-based cross-linking agents. These may be used alone or as a mixture of two or more. A particularly suitable cross-linking agent is an isocyanate-based cross-linking agent, and with respect to 100 parts by mass of the monomers (for example, the total of BA and AA) that are constituent units of the polymer composing the pressure sensitive adhesive, the isocyanate-based cross-linking agent may be 0.3 to 4 parts by mass, preferably 0.5 to 3 parts by mass. When the isocyanate-based cross-linking agent is 0.3 parts by mass or more, the cohesive force of the pressure sensitive adhesive is improved, and when the pressure sensitive adhesive sheet is peeled off from the structure, adhesive residue on the structure can be prevented and the re-peelability can be improved. Further, when the isocyanate-based cross-linking agent is 4 parts by mass or less, the pressure sensitive adhesive has appropriate flexibility, so the ability to follow the unevenness of the surface of the structure can be improved, and air bubbles can be prevented from being caught when the pressure sensitive adhesive sheet is attached.

Specific examples of the isocyanate-based cross-linking agent include polyvalent isocyanate compounds such as 2,4-Tolylene diisocyanate, 2,6-tolylene diisocyanate, 1,3-xylylene diisocyanate, 1,4-xylene diisocyanate, diphenylmethane-4,4'-diisocyanate, diphenylmethane-2,4'-diisocyanate, 3-methyldiphenylmethane diisocyanate, hexamethylene diisocyanate, isophorone diisocyanate, dicyclohexylmethane-4,4'-diisocyanate, dicyclohexylmethane-2,4'-diisocyanate, lysine isocyanate, and the like. These may be used alone or as a mixture of two or more.

When the pressure sensitive adhesive contains a cross-linked product of a (meth) acrylic copolymer, the degree of cross-linking (gel fraction) of the layer D is not particularly limited, but may be, for example, preferably 10% by mass or more, more preferably 15% by mass or more, more preferably 20% by mass or more, and particularly preferably 25% by mass or more. The degree of cross-linking (gel fraction) of the layer D is preferably 80% by mass or less, more preferably 75% by mass or less, further preferably 70% by mass or less, and particularly preferably 60% by mass or less. That is, the degree of cross-linking (gel fraction) of the layer D may be, for example, preferably 10 to 80% by mass, more preferably 15 to 75% by mass, even more preferably 20 to 70% by mass, and particularly preferably 25 to 60% by mass. The degree of cross-linking (gel fraction) can be adjusted by, for example, the composition of the base polymer (pressure sensitive adhesive) of the (meth) acrylic copolymer, the molecular weight, the presence or absence of the cross-linking agent and the type thereof, and the selection of the amount used. In addition, the upper limit of the degree of cross-linking is 100% by mass.

The tackifier can be selected in consideration of the softening point, compatibility with each component, and the like. For example, terpene resin, rosin resin, hydrogenated rosin resin, coumarone-indene resin, styrene resin, aliphatic petroleum resin, alicyclic petroleum resin, terpene-phenol resin, xylene resin, and other aliphatic hydrocarbon resins. Alternatively, an aromatic hydrocarbon resin or the like can be mentioned. These may be used alone or as a mixture of two or more.

The ultraviolet absorber can be selected in consideration of the ultraviolet absorbing ability, compatibility with the (meth) acrylic pressure sensitive adhesive to be used, and the like. For example, hydroquinone-based, benzotriazole-based, benzophenone-based, triazine-based, cyanoacrylate-based ultraviolet absorber and the like can be mentioned. These may be used alone or as a mixture of two or more.

The light stabilizer can be selected in consideration of compatibility with the (meth) acrylic pressure sensitive adhesive to be used, and the thickness, and the like. For example, hindered amine compounds, hindered phenol compounds, benzoate compounds, nickel complex salt compounds and the like can be mentioned. These may be used alone or as a mixture of two or more.

The layer D composed of the pressure sensitive adhesive can be formed by a general method. For example, there is a method (direct coating method) in which a pressure sensitive adhesive is directly applied and dried to the surface of the layer B to be bonded with the layer C and/or the surface of the layer C to be bonded with the layer B. Another method is to apply the pressure sensitive adhesive to a separator, and then dry and attach it to the substrate (the layer B and/or the layer C).

The coating of the pressure sensitive adhesive can be performed using a conventionally known coating device such as a gravure roll coater, a die coater, a bar coater, a doctor blade, a comma coater, and a reverse coater. Further, the pressure sensitive adhesive may be applied by impregnation, curtain coating method or the like. If necessary, the pressure sensitive adhesive may be applied while cooling, heating, or irradiating with an electron beam.

Drying after applying the pressure sensitive adhesive is preferably performed under heating from the viewpoint of promoting the cross-linking reaction and improving the production efficiency. The drying temperature is, for example, 40° C. or higher (usually 60° C. or higher), preferably about 150° C. or lower (usually 130° C. or lower).

In the step of forming the layer D, after the pressure sensitive adhesive is applied and dried, the component transfer in the layer D is adjusted, for the purpose of adjusting component transfer in the layer D, progressing the cross-linking reaction, and alleviating strains that may exist in the substrate (for example, layer A/layer B laminate, separator, and the like) and in the layer D, aging may be performed.

Examples of reactive adhesive include (meta) acrylic resin reactive adhesive, natural rubber reactive adhesive, urethane resin reactive adhesive, ethylene-vinyl acetate resin emulsion reactive adhesive, ethylene-vinyl acetate resin reactive adhesive, epoxy resin reactive adhesive, vinyl chloride resin solvent reactive adhesive, chloroprene rubber reactive adhesive, cyanoacrylate reactive adhesive, silicone reactive adhesive, styrene-butadiene rubber solvent reactive adhesive, nitrile rubber reactive adhesive, nitrocellulose reactive adhesive, phenol resin reactive adhesive, modified silicone reactive adhesive, polyester reactive adhesive, polyamide reactive adhesive, polyimide reactive adhesive, olefin resin reactive adhesive, vinyl acetate resin emulsion reactive adhesive, polystyrene resin solvent reactive adhesive, polyvinyl alcohol reactive adhesive, polyvinylpyrrolidone resin reactive adhesive, polyvinyl butyral reactive adhesive, polybenzimidazole reactive adhesive, polymethacrylate resin solvent reactive adhesive, melamine resin reactive adhesive, urea resin reactive adhesive, resorcinol reactive adhesive, and the like. As the reactive adhesive, one type may be used alone, or two or more types may be used as a mixture.

Reactive adhesives can be classified into hot melt reactive adhesives, two-component curable reactive adhesives, heat-curable reactive adhesives, UV curable reactive adhesives, and the like when classified by adhesive form. Among these, two-component curable reactive adhesives, thermosetting reactive adhesives and UV curable reactive adhesives may be preferably used because of their ease of handling and stable adhesive strength development.

Among the above reactive adhesives, a (meth) acrylic resin-based two-component curable reactive adhesive is preferable because of its ease of handling and stable adhesive strength development.

As for the reactive adhesive, additives such as the above-mentioned cross-linking agent, tackifier, ultraviolet absorber, and light stabilizer can be added, if necessary. Further, a rocking agent, a pigment, a defoaming agent, a diluent, a curing rate adjusting agent and the like can be added as long as the performance is not affected.

The layer D composed of the reactive adhesive can be formed by a common method. For example, a method of directly applying a reactive adhesive to the surface of the layer B to be bonded with the layer C and/or the surface of the layer C to be bonded with the layer B can be mentioned. As a method for curing the reactive adhesive, an appropriate method (heating, UV irradiation, etc.) may be adopted depending on the type of the reactive adhesive after the layer B and the layer C are bonded to each other via the layer D. Another method is to apply the reactive adhesive to a separator, and then dry and attach it to the substrate (the layer B and/or the layer C).

Methods for applying the reactive adhesive include a solvent-based dry laminating method, a solventless dry laminating method, a wet laminating method, a hot melt laminating method, and the like, and these methods may be appropriately used. Of these, the most suitable coating method is the solvent type dry laminating method.

As the organic solvent used in the solvent type dry laminating method, any solvent having solubility with the adhesive can be used. For example, water-insoluble solvents such as toluene, xylene, methyl acetate, ethyl acetate, butyl acetate, acetone and methyl ethyl ketone; glycol ethers such as 2-methoxyethanol, 2-ethoxyethanol, 2-propanol, 2-butoxyethanol, 1-methoxy-2-propanol, 1-ethoxy-2-propanol, and 1-propanol-2-propanol; alcohols such as methanol, ethanol, 1-propanol, 2-propanol, 1-butanol, and 2-butanol; aldehydes such as acetaldehyde and propionaldehyde; aprotic polar solvents such as N, N-dimethylformamide, N, N-dimethylacetamide, dimethyl sulfoxide, and N-methylpyrrolidone, and the like can be mentioned.

The reactive adhesive diluted with a solvent (hereinafter, this may be referred to as "applying liquid") may be diluted to a concentration such that the viscosity of a Zahn cup (No. 3) is in the range of 5 to 30 seconds (25° C.). If the viscosity of the Zahn cup (No. 3) is 5 seconds or more, the reactive adhesive is sufficiently applied to the object to be coated, and the roll is not contaminated. Further, when the viscosity of the Zahn cup (No. 3) is 30 seconds or less, the reactive adhesive is sufficiently transferred to the roll, and a uniform adhesive layer can be easily formed. For example, in dry laminating, the Zahn Cup (No. 3) viscosity is preferably 10 to 20 seconds (25° C.) at the time of its use.

Further, when a solvent is used, the solvent drying temperature after applying the reactive adhesive may be various from 20° C. to 140° C., but it is desirable that the temperature is close to the boiling point of the solvent and does not affect the object to be coated. If the drying temperature is less than 20° C., the solvent remains in the laminated film, which causes poor adhesion and odor. If the drying temperature exceeds 140° C., it becomes difficult to obtain a laminated film having a good appearance due to softening of the polymer film or the like. For example, 40 to 120° C. is desirable.

As the coating method for applying the reactive adhesive paint, any of the commonly used coating methods such as roll coating, spray coating, air knife coating, dipping, and brush coating can be used, but roll coating or spray coating are preferable.

<1-5. Layer E>

The layer E is composed of the adhesive. The layer E can function as a bonding layer when the laminate is attached to a structure. Further, when the structure is a transparent member, by using a thick transparent layer E, it is possible to exert a function of recovering the transparency of the transparent member whose surface is damaged and the transparency is lowered.

The type of adhesive used for the layer E may be appropriately determined depending on the material of the surface of the structure to which the laminate is attached. For example, if the surface of the structure is composed of one or more types of material selected from a group consisting of poly (meth) acrylic acid ester-based resin, polyvinyl chloride-based resin, polycarbonate-based resin, polystyrene-based resin, acrylonitrile-butadiene-styrene copolymer (ABS resin), glass, and metal, pressure sensitive adhesives can be preferably used. Further, if the surface of the structure is composed of one or more types of material selected from a group consisting of concrete and metal, reactive adhesives can be preferably used. Further, a reactive adhesive is suitable for concrete or the like having a large surface unevenness, and a pressure sensitive adhesive is suitable for a resin or glass which has a small surface unevenness. Further, it is preferable to use a pressure sensitive adhesive when re-peeling is desired, and a reactive adhesive is preferably used when strong adhesion is desired without re-peeling.

The thickness of the layer E is preferably 10 μm or more, more preferably 20 μm or more, and even more preferably 30 μm or more, from the viewpoint of improving the followability to the unevenness of the surface of the structure and enhancing the transparency recovery function. Further, the thickness of the layer E is preferably 100 μm or less, more preferably 80 μm or less, and even more preferably 60 μm or less from the viewpoint of preventing the occurrence of drying defects in the drying step of the adhesive and to sufficiently exhibit the adhesive performance.

Further, in order to increase the adhesive strength between the layer C and the layer E, the surface of the side on which the layer C is laminated with respect to the layer E may be subjected to a surface treatment such as corona discharge treatment, plasma treatment (atmospheric pressure and vacuum), high frequency sputtering etching treatment, frame treatment, ITRO treatment, excimer UV treatment, and primer treatment. Further, a roughening treatment such as physically scraping the surface may be performed by sandpaper, Keren, blasting or the like. Examples of the primer include acrylic-based, ethylene vinyl acetate-based, urethane-based and epoxy-based primers, but acrylic-based primer is preferable from the viewpoint of increasing the adhesive strength with the layer C.

In addition, specific examples and preferred embodiments of the pressure sensitive adhesive and the reactive adhesive are as described regarding the layer D, and thus the description here will be omitted.

<1-6. Separator>

As the separator, a known common separator can be used. For example, a PET sheet surface coated with a silicone-based release agent, a paper and polyethylene laminate sheet coated with a silicone-based release agent on the polyethylene side, and the like can be mentioned.

2. Structure

By attaching the laminate according to the present invention to various structures with the layer E as the attachment side, the antifouling property and the anti-scattering property of the structure are improved. Therefore, the laminate according to the present invention can be used for protecting or repairing a structure. For example, attaching the laminate according to the present invention to concrete is a surface coating method for preventing deterioration of concrete, or is a method for preventing peeling of concrete pieces.

FIG. 2-1 is a schematic view showing the lamination structure of the structure according to the first embodiment of the present invention. In the first embodiment, the layer E (15) of the laminate (30) is attached to the surface of the structure (17). Further, FIG. 2-2 is a schematic view showing the lamination structure of the structure according to the second embodiment of the present invention. In the second embodiment, the layer E (15) of the laminate (40) is attached to the surface of the structure (17).

The shape of the structure to which the laminate is attached is not particularly limited, but may be, for example, a plate shape. In that case, the surface protection sheet can be attached to one or both main surfaces of the plate-shaped structure, and it is preferable to attach the surface protection sheet to both main surfaces.

There are no particular restrictions on the material of the structure to which the laminate is attached, but is may be composed of one or more types of material selected from a group consisting of poly (meth) acrylic acid ester-based resin, polyvinyl chloride-based resin, polycarbonate-based resin, polystyrene-based resin, acrylonitrile-butadiene-styrene copolymer (ABS resin), glass, concrete and metal (such as aluminum foil, steel plate). In addition, the material of the structure can be widely selected from acrylonitrile-butadiene-styrene copolymer, plastic base material such as FRP, plywood and the like.

Specific examples of applications to structures include, but are not limited to, sound insulation walls (including sound attenuation walls) installed on highways and trunk roads, exterior panels, exteriors, carports, vending machine windows, windows of vehicles such as automobiles, trains, express railways and airplanes, and home doors and signs installed at railway stations. Among these, applications that are particularly expected to be utilized include light transmissive or impermeable sound insulation walls and exterior panels. Since the laminate according to the present invention can be easily provided in the form of a highly transparent sheet, it can be suitably utilized when the structure is a light transmissive member (the concept of light transmissive member includes transparent members).

For example, light transmissive panels (plastic panels, glass panels, or typically polycarbonate panels) and exterior panels (typically metal panels) are often used for sound insulation walls installed on highways and trunk roads. However, light transmissive panels have a problem that the transparency and toughness decrease due to deterioration over time. By attaching the laminate according to the present invention to one or both main surfaces of the deteriorated light transmissive panel, preferably both main surfaces, it becomes possible to enhance the anti-scattering performance when the light transmissive panel is damaged, and also possible to restore transparency in preferred embodiments. That is, by using the laminated body according to the present invention, it is possible to obtain a remarkable effect that the repair work of the light transmissive panels can be performed by a simple work. Specifically, the laminate according to the present invention can be suitably used for repair work of sound insulation walls or exterior panels that has been installed for 1 year or more, preferably 5 years or more, and even more preferably 15 years or more. Further, by attaching the surface protection sheet according to the present invention to one or both main surfaces of a new transparent panel, preferably both main surfaces, deterioration over time is suppressed, and it is possible to improve the anti-scattering performance when the transparent panel is damaged, and in preferred embodiments, is possible to prevent the transparent panel itself from becoming opaque.

EXAMPLES

Hereinafter, the present invention will be described in detail based on Examples in comparison with Comparative Examples.

1. Preparation of Pellets for Layer A

As a polyvinylidene fluoride-based resin, trade name Kynar720 manufactured by Arkema (homopolymer of vinylidene fluoride, MFR (in accordance with ISO1133, 230° C., 3.8 kg load): 18 to 26 g/10 minutes, hereinafter abbreviated as "PVDF") was prepared. As a poly (meth) acrylic acid ester-based resin, trade name Hipet HBS000Z60 manufactured by Mitsubishi Chemical Co., Ltd., (methyl methacrylate-butyl acrylate copolymer, MFR (in accordance with ISO1133, 230° C., 10 kg load): 5 to 9 g/10 minutes, hereinafter abbreviated as "acrylic resin") was prepared. Blends were prepared in various ratios according to the molding numbers so that the contents of PVDF and the acrylic resin with respect to the total mass of the resin composition constituting the layer A become the values shown in Table 1. Using a φ30 mm different direction rotating twin-screw extruder (KTX-30, manufactured by Kobe Steel, Ltd.), the mixture was melt-kneaded under the conditions of an extrusion temperature of 240° C. and a screw rotation speed of 200 rpm, and extruded into a strand shape. The strand-shaped kneaded product was cooled and then pelletized with a pelletizer. No other additive such as an ultraviolet absorber was added to the pellets.

2. Preparation of Pellets for Layer B

The PVDF and acrylic resin same as the layer A were prepared. Blends were prepared in various ratios according to the molding numbers so that the contents of PVDF and the acrylic resin with respect to the total mass of the resin composition constituting the layer B become the values shown in Table 1. Using a φ30 mm different direction rotating twin-screw extruder (KTX-30, manufactured by Kobe Steel, Ltd.), the mixture was melt-kneaded under the conditions of an extrusion temperature of 240° C. and a screw rotation speed of 200 rpm, and extruded into a strand shape. The strand-shaped kneaded product was cooled and then pelletized with a pelletizer. No other additive such as an ultraviolet absorber was added to the pellets.

3. Preparation of Sheet-Shaped Molded Product in which Layer A and Layer B are Laminated The pellets for layer A and the pellets for layer B prepared above were subjected to two-type two-layer coextrusion molding by using two φ40 mm single shaft extruders and a feed block type T-die multi-layer extruder equipped with a feed block and a T-die with a lip width of 550 mm at the tip to obtain various sheet-shaped molded products (molding examples 1 to 14 shown in Table 1) in which the layer A and the layer B were laminated. The extrusion of the layer A and the layer B was carried out under the conditions of an extrusion temperature of 240° C. and a T-die temperature of 240° C. The temperature of the pinch roll closest to the die of the take-up device was set to 30° C. As the pinch roll, a mirror-finished one or an embossed one was used according to the molding numbers.

TABLE 1

| Molding number | Layer A | | | Layer B | | | Pinch roll |
|---|---|---|---|---|---|---|---|
| | PVDF wt % | Acrylic resin wt % | Thickness μm | PVDF wt % | Acrylic resin wt % | Thickness μm | |
| Molding Example 1 | 100 | 0 | 25 | 25 | 75 | 25 | Mirror rubber roll |
| Molding Example 2 | 90 | 10 | 25 | 25 | 75 | 25 | Mirror rubber roll |
| Molding Example 3 | 80 | 20 | 25 | 25 | 75 | 25 | Mirror rubber roll |
| Molding Example 4 | 75 | 25 | 25 | 25 | 75 | 25 | Mirror rubber roll |
| Molding Example 5 | 60 | 40 | 25 | 25 | 75 | 25 | Mirror rubber roll |
| Molding Example 6 | 50 | 50 | 25 | 25 | 75 | 25 | Mirror rubber roll |
| Molding Example 7 | 45 | 55 | 25 | 25 | 75 | 25 | Mirror rubber roll |
| Molding Example 8 | 80 | 20 | 25 | 0 | 100 | 25 | Mirror rubber roll |
| Molding Example 9 | 80 | 20 | 25 | 10 | 90 | 25 | Mirror rubber roll |
| Molding Example 10 | 80 | 20 | 25 | 20 | 80 | 25 | Mirror rubber roll |
| Molding Example 11 | 80 | 20 | 25 | 40 | 60 | 25 | Mirror rubber roll |
| Molding Example 12 | 80 | 20 | 25 | 49 | 51 | 25 | Mirror rubber roll |
| Molding Example 13 | 80 | 20 | 25 | 55 | 45 | 25 | Mirror rubber roll |
| Molding Example 14 | 80 | 20 | 25 | 25 | 75 | 25 | Embossed rubber roll |

4. Preparation of Sheet-Shaped Molded Product for Layer C

PET-1 to PET-9 shown in Table 2 were used as the polyethylene terephthalate-based resin. PET-1 to PET-4 were sold in the form of a sheet that had been biaxially oriented and had both surfaces treated with an acrylic primer, and were used as they were. PET-5 to PET-9 were sold in the form of pellets, and they were subjected to sheet extrusion by using a φ 65 mm single shaft extruder (manufactured by Tanabe Plastics Machinery Co., Ltd., VS65-34V) equipped with a feed block and a T-die with a lip width of 300 mm at the tip at an extrusion temperature of 280° C., a T-die temperature of 280° C., and a screw rotation speed of 30 rpm. The obtained sheet was then stretched at a set orientation ratio of 2.0 times in the flow direction (Machine Direction, MD) using a 400-type longitudinal orientation roll unit (manufactured by Tanabe Plastics Machinery Co., Ltd.) with a setting of cast roll temperature of 30° C., orientation roll temperature of 95° C., and heat-fixing roll temperature of 30° C., to prepare an MD uniaxially oriented sheet. The obtained sheet was further stretched in a direction perpendicular to MD (Transverse Direction, TD) at a set stretching ratio of 5.0 times using a tenter type stretching machine (manufactured by Kobayashi Kikai Kogyo Co., Ltd.) with a setting temperature of preheating zone of 140° C., stretching zone of 125° C., and a heat fixing temperature of 220° C. to prepare a biaxially oriented sheet shown in Table 2.

PA-1 and PA-2 shown in Table 2 were used as the polyamide-based resin. PA-1 and PA-2 were sold in the form of biaxially oriented sheets. Further, PA-1 and PA-2 were sold in a state where one surface was subjected to corona discharge treatment, but corona discharge treatment was also carried out on the other surface.

was attached to the tip of a φ40 mm single shaft extruder, and single-layer extrusion molding was performed to prepare a sheet-shaped molded product. The extrusion temperature was 230° C., the T-die temperature was 230° C., and the cooling roll temperature was 30° C.

As the polyurethane resin, PU-1 and PU-2 shown in Table 2 were used. PU-1 and PU-2 were sold in the form of sheets and were used as they were.

For each sheet-shaped molded product for the layer C, a tensile property test method in accordance with JIS K7161-1994 under conditions of test speed: 200 mm/min, gauge length: 50 mm, and width of test piece: 10 mm was performed using a tensile tester Strograph VE1D manufactured by Toyo Seiki Seisaku-sho, Ltd to obtain a stress-strain curve. Then, based on the obtained stress-strain curve, the value of nominal tensile strain (elongation), the classification of ductile fracture or brittle fracture, and the presence or absence of a yield point were investigated. The results are shown in Table 2.

TABLE 2

| Layer C | Manufacturer | Grade | Thickness μm | Nominal Tensile strain (elongation) % | Yield point Elongation between 0 and 100% | Brittle / ductile fracture | Biaxial orientation |
|---|---|---|---|---|---|---|---|
| PET-1 | TORAY | Lumirror # 50-U32 | 50 | 130 | Present | Ductile fracture | Yes |
| PET-2 | TORAY | Lumirror # 100-U34 | 100 | 170 | Present | Ductile fracture | Yes |
| PET-3 | TORAY | Lumirror # 50-U483 | 50 | 140 | Present | Ductile fracture | Yes |
| PET-4 | TORAY | Lumirror # 100-U483 | 100 | 150 | Present | Ductile fracture | Yes |
| PET-5 | Lotte Chemical | PET TB-380 | 10 | 130 | Present | Ductile fracture | Yes |
| PET-6 | Lotte Chemical | PET TB-380 | 20 | 130 | Present | Ductile fracture | Yes |
| PET-7 | Lotte Chemical | PET TB-380 | 50 | 140 | Present | Ductile fracture | Yes |
| PET-8 | Lotte Chemical | PET TB-380 | 100 | 140 | Present | Ductile fracture | Yes |
| PET-9 | Lotte Chemical | PET TB-380 | 150 | 150 | Present | Ductile fracture | Yes |
| PA-1 | Mitsubishi Chemical | SANTONYLE SNR | 15 | 100 | Present | Ductile fracture | Yes |
| PA-2 | Mitsubishi Chemical | SANTONYLE SNR | 25 | 100 | Present | Ductile fracture | Yes |
| PC-1 | Mitsubishi Gas Chemical | lupilon film FE-2000 | 100 | 140 | Present | Ductile fracture | No |
| PVC-1 | Morino Kako | Emron vinyl chloride Color, transparent Surface finish, glossy | 100 | 100 | Present | Ductile fracture | No |
| PS-1 | Toyo Styrene | Toyo Styrol GP G200C | 100 | 4 | Absent | Brittle fracture | No |
| MBS-1 | Denke | Denka TH Polymer TH-23 | 100 | 25 | Present | Brittle fracture | No |
| PU-1 | Nihon Matal | U-1940 | 30 | >200 | Absent | Ductile fracture | No |
| PU-2 | Nihon Matal | U-1940 | 100 | >200 | Absent | Ductile fracture | No |

As the polycarbonate-based resin, PC-1 shown in Table 2 was used. PC-1 was sold in the form of a sheet and was used as it was.

As the polyvinyl chloride-based resin, PVC-1 shown in Table 2 was used. PVC-1 was sold in the form of a sheet and was used as it was.

As the polystyrene-based resin, PS-1 shown in Table 2 was used. PS-1 was sold in the form of pellets. A T-die having a lip width of 550 mm was attached to the tip of a φ40 mm single shaft extruder, and single-layer extrusion molding was performed to prepare a sheet-shaped molded product. The extrusion temperature was 210° C., the T-die temperature was 210° C., and the cooling roll temperature was 30° C.

As the methyl methacrylate butadiene styrene copolymer resin, MBS-1 shown in Table 2 was used. MBS-1 was sold in the form of pellets. A T-die having a lip width of 550 mm 5. Preparation of Adhesive for Layer D Pressure sensitive adhesive 1: The isocyanate-based cross-linking agent shown in Table 3 was blended in parts by mass shown in Table 3 with 100 parts by mass of the acrylic pressure sensitive adhesive shown in Table 3 to prepare the pressure sensitive adhesive 1.

Pressure sensitive adhesive 2: The isocyanate-based cross-linking agent shown in Table 3 was blended in parts by mass shown in Table 3 with 100 parts by mass of the acrylic pressure sensitive adhesive shown in Table 3 to prepare the pressure sensitive adhesive 2.

Pressure sensitive adhesive 3: The epoxy-based cross-linking agent and diluting solvent shown in Table 3 were blended in parts by mass shown in Table 3 with 60 parts by mass of the acrylic pressure sensitive adhesive shown in Table 3 to prepare the pressure sensitive adhesive 3.

TABLE 3

| Layer D | Pressure sensitive | | | | Cross-linking agent | | | | Diluting solvent | |
|---|---|---|---|---|---|---|---|---|---|---|
| | Maker | Grade name | Classification | Blending amount | Maker | Grade name | Classification | Blending amount | Type | Blending amount |
| Pressure sensitive adhesive 1 | Nippon Carbide Industries | Nissetsu PE-121 | Acrylic-based | 100 | Nippon carbide Industries | Nissetsu CK-101 | Isocyanate-based | 2.3 | — | — |
| Pressure sensitive adhesive 2 | Soken Chemical | SK Dyne 1131B | Acrylic-based | 100 | Tosoh | CORONATE L-46E | Isocyanate-based | 2.0 | — | — |
| Pressure sensitive adhesive 3 | Soken Chemical | SK Dyne 2094 | Acrylic-based | 60 | Soken Chemical | E-AX | Epoxy-based | 0.17 | Toluene | 27 |

※

Nissetsu PE-121: Butyl acrylate-acrylic acid copolymer (BA / AA = 90 / 10), weight average molecular weight (Mw) 690,000, solid content 35% by mass
SK Dyne 1131B: Poly2-ethylhexyl acrylate, weght average molecular weight (Mw) 600,000, solid content 40% by mass
SK Dyne 2094: Butyl acrylate-carboxyl group-containing monomer copolymer, weight average molecular weight (Mw) 850,000, solid content 25% by mass
Nissetsu CK-101; Polyfunctional isocyanate-based cross-linking agent, solid content 45% by mass
CORONATE L-46E: trimethylolpropane-modified tolylene diisocyanate, solid content 45% by mass
E-AX: N,N,N',N'-tetraglycidyl-m-xylylonediamine, solid content 5% by mass

6. Preparation of Laminate Comprising Layer A, Layer B and Layer C

Various laminates of Examples and Comparative Examples having the lamination structure shown in Table 4 using the above-mentioned molded products in which the layer A and the layer B are laminated, the pressure sensitive adhesive for the layer D, and the molded products for the layer C were prepared.

When the adhesive for the layer D was not used, the molded product in which the layer A and the layer B were laminated and the molded product for the layer C were heat-laminated (heat sealing) at 160° C. with the layer B and the layer C facing each other, and a sheet-shape laminate comprising the layer A, the layer B, and the layer C in this order was produced thereby.

When the adhesive for the layer D was used, the adhesive for the layer D was applied to the layer B of the molded product in which the layer A and the layer B were laminated, dried at 130° C., and a layer D having a thickness of 50 μm (dry) was formed thereby. The molded product of layer C was attached to this layer D to prepare a sheet-shape laminated body comprising the layer A, the layer B, the layer D and the layer C in this order.

Various characteristics shown below were evaluated for each of the sheet-shape laminates of Examples and Comparative Examples prepared in this manner. The results are shown in Table 4.

<Total Light Transmittance>

Using a haze meter NDH7000 (manufactured by NIPPON DENSHOKU INDUSTRIES CO., LTD.), the total light transmittance of each sheet-shaped laminate was determined in accordance with JIS K7361-1-1997.

<Haze>

Using a haze meter NDH7000 (manufactured by NIPPON DENSHOKU INDUSTRIES CO., LTD.), the HAZE value of each sheet-shape laminate was measured in accordance with JIS K7136-2000.

<Anti-Fouling Property>

A test was performed in accordance with the Public Works Research Center: Anti-fouling Material Evaluation Promotion Test—Anti-fouling Material Evaluation Promotion Test Method III, and the difference in brightness (ΔL*) before and after the test of each sheet-shape laminate was measured, and the absolute value (|ΔL*|) of the difference in brightness (ΔL*) was used as an index of antifouling property. The brightness of each sheet-shape laminate was measured from the layer A side. A suspension was prepared by the specified material and method, and the pretreatment of the test piece was performed by the specified method. The brightness difference (ΔL*) was calculated based on the following formula using a color meter ZE6000 manufactured by NIPPON DENSHOKU INDUSTRIES CO., LTD. The anti-fouling property was evaluated using the absolute value (|ΔL*|) of the obtained brightness difference (ΔL*) as an index. The larger the absolute value (|ΔL*|) of the brightness difference (ΔL*) before and after the test is, the dirtier it is. The absolute value (|ΔL*|) that is judged to have good anti-fouling property was 3.2 or less according to the criteria of the Anti-fouling Material Evaluation Promotion Test Method III. However, at the time of evaluation in the Examples, even in the case of 2.0 or more, it was possible to visually confirm dirtiness. Therefore, a stricter standard of less than 2.0 was set as preferable. The absolute value (|ΔL*|) is more preferably 1.5 or less, further preferably 1.3 or less, and particularly preferably 1.2 or less.

$$\text{Brightness difference}(\Delta L^*) = (\text{average brightness } L_1^* \text{ after test}) - (\text{average brightness } L_0^* \text{ before test})$$

<Adhesive Strength>

For each sheet-shape laminate, using a tensile tester Strograph VE1D manufactured by Toyo Seiki Seisaku-sho, Ltd., the adhesive strength between the layer B and the layer C was measured according to the method for measuring the peeling adhesive strength specified in JIS Z0237-2009 (Method 1: 180° peeling adhesive strength for a test plate). At this time, if the peeling adhesive strength was strong and the material was destroyed before the peeling, it was indicated as >20 N/25 mm.

In addition, only Comparative Example 13 showed the adhesive strength between the white opaque film for solar cells and the acrylic plate (manufactured by Mitsubishi Chemical Co., Ltd., Acrylite L, color tone: colorless 001) via the pressure sensitive adhesive 1.

Specifically, first, the layer B/layer C of each sheet-shaped laminate was peeled by 25 mm, and each sheet-shaped laminate was cut into a width of 25 mm in a direction orthogonal to the peeling direction, and a sample for measurement having a width of 25 mm was prepared. Next, the sample for measurement was fixed to a stainless steel plate, the 180° peeling force was measured at a peeling speed of 300 mm/min, and the average peeling force between 25 and 75 mm was defined as the adhesive strength (N/25 mm) between the layer B/layer C. At this time, the average peeling force between 25 and 75 mm was calculated. When MD/TD can be distinguished, the average peeling force of each of MD/TD was calculated and the average value was used. When MD/TD could not be distinguished, the average peeling force in any direction was calculated and used. Preferred adhesive strength between the layer B/layer C was set to 10 N/25 mm or more. If it is less than 10 N/25 mm, the sheet-shape laminate may peel off at the interface between the layer B/layer C during the impact test, and there is a concern that the anti-scattering property may be lowered. The adhesive strength between the layer B/layer C is more preferably 12 N/25 mm or more, even more preferably 13 N/25 mm or more, and particularly preferably 15 N/25 mm or more.

<Load-displacement diagram integral value>

For each sheet-shape laminate, using a tensile tester Strograph VE1D manufactured by Toyo Seiki Seisaku-sho, Ltd., a tensile property test method in accordance with JIS K7161-1994 under conditions of test speed: 200 mm/min, gauge length: 50 mm, and width of test piece: 10 mm was performed. The integrated value (Nm) from 0 mm to 50 mm of displacement was calculated from the load-displacement diagram. When MD/TD can be distinguished, the integrated value (Nm) of each of MD/TD was calculated, and the average value was used. When MD/TD could not be distinguished, the integrated value (Nm) in any direction was calculated and used.

<High-Speed Impact Test>

The layer C (layer B if there is no layer C) of each sheet-shape laminate was attached via an acrylic-based pressure sensitive adhesive (pressure sensitive adhesive 2 was used only in Comparative Examples 6 and 7, and pressure sensitive adhesive 1 was used in all other cases) at room temperature to the entire surface (one side or both sides) of an acrylic plate (manufactured by Mitsubishi Chemical Corporation, Acrylite L, color tone: colorless 001, dimensions: 120 mm×120 mm×thickness 5 mm) so that air bubbles did not occur, and thereby a test plate was obtained. Next, using a Shimadzu Hydroshot High-Speed Puncture Impact Testing Machine "HITS-P10" (model name) available from Shimadzu Corporation, in accordance with JIS K7211-2: 2006, the scattering rate when an impact was applied to the laminate-attached surface of each test plate was measured under the following conditions. The scattering rate is a value calculated by the following formula. In addition, as Reference Example 1, the result when the laminate was not attached is shown.

<Test Conditions>

. . . Striker speed: 4.3 m/s

. . . Striker tip: φ 20 mm

. . . Die diameter of test piece cradle: φ 40 mm

Scattering rate (%)=100−(test plate weight after high-speed impact test/test plate weight before high-speed impact test×100)

The high-speed impact test was carried out as a simple evaluation method for the impact resistance test of sound insulation walls. From the weight (iron ball) mass of 300 kg (m), gravitational acceleration of 9.8 m/s$^2$ (g), and lifting height of the weight from the impact point of 0.95 m (h) in the impact resistance test of the sound insulation wall, the potential energy (U=mgh=2,793J) was calculated. From the law of conservation of energy (U=K), applying kinetic energy (K=½ mv$^2$), the weight (iron ball) velocity (v=4.3 m/s) at the impact point was calculated and used as the striker velocity in the high-speed impact test. In addition, a striker tip diameter of φ 20 mm specified in JIS K7211-2: 2006 was selected because it was close to the protrusion diameter of the weight (iron ball) used in the impact resistance test of the sound insulation wall. As a result, it was confirmed that the result of the high-speed impact test and the result of the impact resistance test of the sound insulation wall correlate with each other.

<Impact Resistance Test of Sound Insulation Wall>

The layer C (layer B if there was no layer C) of each sheet-shape laminate was attached via an acrylic-based pressure sensitive adhesive (pressure sensitive adhesive 2 was used only in Comparative Examples 6 and 7, and pressure sensitive adhesive 1 was used in all other cases) at room temperature to the entire surface (one side or both sides) of a PVC light transmissive plate that imitates a sound insulation wall (manufactured by Mitsubishi Chemical Corporation, HISHIPLATE NT300, dimensions: 1,000 mm×2,000 mm×thickness 10 mm, fixed with a metal sash used for sound insulation walls) so that air bubbles did not occur, and thereby a test plate was obtained. Next, in accordance with the NEXCO test method, Volume 9, environment-related test method, August 2016 edition, "Impact resistance test method for sound insulation walls", a shot bag test was carried out on the laminate-attached surface of each test plate under the conditions shown below, and the scattering rate was measured. The scattering rate is a value calculated by the following formula. In addition, as Reference Example 2, the result when the laminate was not attached was shown.

<Test Conditions>

Weight (iron ball): 300 kg

Lifting height of weight from impact point: 95 cm

Weight protrusion: Tip φ 24 mm×protrusion length 50 mm

Scattering rate (%)=100−(test plate weight after high-speed impact test/test plate weight before high-speed impact test×100)

TABLE 4-1

| | Laminate structure | | | Total light trans-mittance % | HAZE % | Anti-fouling property [ΔL*] | Adhesive strength N / 25 mm | Load-displacement diagram integral value Displacement between 0 and 50 mm N·m (=J) | High-speed impact test Scattering rate (one side) % | High-speed impact test Scattering rate (both sides) % | Impact resistance test of sound insulation wall Scattering rate (one side) % | Impact resistance test of sound insulation wall Scattering rate (both sides) % |
|---|---|---|---|---|---|---|---|---|---|---|---|---|
| | Layer A / Layer B Molded product | Layer D Adhesive layer | Layer C Molded product | | | | | | | | | |
| Example 1 | Molding example 1 | None | PET-2 | 91 | 5.0 | 0.4 | >20.0 | 7.8 | 3.3 | 0.4 | 3 | <1 |
| Example 2 | Molding example 2 | None | PET-2 | 92 | 4.0 | 0.5 | >20.0 | 7.8 | 3.5 | 0.5 | 3 | <1 |
| Example 3 | Molding example 3 | None | PET-2 | 93 | 1.3 | 0.7 | >20.0 | 7.8 | 3.6 | 0.5 | 3 | <1 |
| Example 4 | Molding example 4 | None | PET-2 | 93 | 1.3 | 0.7 | >20.0 | 7.7 | 3.8 | 0.6 | 3 | <1 |
| Example 5 | Molding example 5 | None | PET-2 | 93 | 1.3 | 1.2 | >20.0 | 7.7 | 3.8 | 0.6 | 3 | <1 |
| Example 6 | Molding example 6 | None | PET-2 | 93 | 1.3 | 1.5 | >20.0 | 7.5 | 4.2 | 0.8 | 3 | <1 |
| Example 7 | Molding example 8 | None | PET-2 | 93 | 1.2 | 0.7 | >20.0 | 7.5 | 3.9 | 0.7 | 3 | 1 |
| Example 8 | Molding example 9 | None | PET-2 | 93 | 1.3 | 0.7 | >20.0 | 7.5 | 3.8 | 0.6 | 3 | 1 |
| Example 9 | Molding example 10 | None | PET-2 | 93 | 1.3 | 0.7 | >20.0 | 7.8 | 3.6 | 0.6 | 3 | <1 |
| Example 10 | Molding example 11 | None | PET-2 | 93 | 1.3 | 0.7 | 14.8 | 7.9 | 5.0 | 2.0 | 5 | 2 |
| Example 11 | Molding example 12 | None | PET-2 | 93 | 1.3 | 0.7 | 10.2 | 7.7 | 5.9 | 2.8 | 9 | 4 |
| Example 12 | Molding example 3 | None | PET-1 | 93 | 1.3 | 0.7 | 19.7 | 4.4 | 4.9 | 1.8 | 5 | 2 |
| Example 13 | Molding example 3 | Pressure sensitive adhesive 1 | PET-1 | 93 | 1.8 | 0.7 | >20.0 | 4.2 | 4.7 | 1.9 | 5 | 2 |
| Example 14 | Molding example 3 | Pressure sensitive adhesive 1 | PET-2 | 93 | 1.3 | 0.7 | >20.0 | 7.8 | 4 0 | 0.6 | 3 | <1 |
| Example 15 | Molding example 3 | Pressure sensitive adhesive 1 | PET-3 | 92 | 2.1 | 0.7 | 15.6 | 4.4 | 4.8 | 1.8 | 5 | 2 |
| Example 16 | Molding example 3 | Pressure sensitive adhesive 1 | PET-4 | 92 | 2.0 | 0.7 | 15.3 | 7.9 | 3.7 | 0.6 | 4 | 2 |
| Example 17 | Molding example 3 | Pressure sensitive adhesive 1 | PET-6 | 91 | 1.5 | 0.7 | 13.2 | 1.2 | 7.0 | 3.0 | 10 | 6 |
| Example 18 | Molding example 3 | Pressure sensitive adhesive 1 | PET-7 | 90 | 2.5 | 0.7 | 12.9 | 4.0 | 6.4 | 2.5 | 6 | 4 |
| Example 19 | Molding example 3 | Pressure sensitive adhesive 1 | PET-8 | 90 | 3.2 | 0.7 | 12.8 | 7.5 | 4.9 | 0.9 | 5 | 2 |
| Example 20 | Molding example 3 | Pressure sensitive adhesive 1 | PET-9 | 90 | 3.9 | 0.7 | 12.1 | 11.0 | 3.7 | 1.2 | 4 | 1 |
| Example 21 | Molding example 3 | Pressure sensitive adhesive 1 | PA-1 | 92 | 2.8 | 0.7 | 15.5 | 1 7 | 4.2 | 1.0 | 7 | 3 |
| Example 22 | Molding example 3 | Pressure sensitive adhesive 1 | PA-2 | 90 | 3.8 | 0.7 | 15.3 | 2.4 | 3.6 | 0.7 | 4 | 1 |
| Example 23 | Molding example 3 | Pressure sensitive adhesive 1 | PC-1 | 91 | 1.3 | 0.7 | 17.3 | 5.7 | 4.4 | 0.9 | 4 | 1 |
| Example 24 | Molding example 3 | None | PVC-1 | 91 | 3.3 | 0.7 | >20.0 | 3.4 | 4.9 | 2.1 | 4 | 2 |
| Example 25 | Molding example 14 | None | PET-2 | 90 | 59.8 | 0.7 | >20.0 | 7.8 | 3.6 | 0.5 | 3 | <1 |

TABLE 4-2

| | Laminate structure | | | Total light trans-mittance % | HAZE % | Anti-fouling property [∠L*] | Adhesive strength N / 25 mm | Load-displacement diagram integral value Displacement between 0 and 50 mm N·m (=J) | Anti-scattering property | | | |
|---|---|---|---|---|---|---|---|---|---|---|---|---|
| | | | | | | | | | High-speed impact test | | Impact resistance test of sound insulation wall | |
| | | | | | | | | | Scattering rate (one side) % | Scattering rate (both sides) % | Scattering rate (one side) % | Scattering rate (both sides) % |
| | Layer A / Layer B Molded product | Layer D Adhesive layer | Layer C Molded product | | | | | | | | | |
| Comparative Example 1 | Molding example 7 | None | PET-2 | 93 | 1.3 | 2.0 | >20.0 | 7.6 | 4.5 | 1.0 | 3 | 1 |
| Comparative Example 2 | Molding example 13 | None | PET-2 | 93 | 1.3 | 0.7 | 8.9 | 7.5 | 8.0 | 3.6 | 15 | 10 |
| Comparative Example 3 | Molding example 3 | Pressure sensitive adhesive 1 | PET-5 | 92 | 1.0 | 0.7 | 13.8 | 0.9 | 8.2 | 4.1 | 18 | 14 |
| Comparative Example 4 | Molding example 3 | Pressure sensitive adhesive 1 | PS-1 | 93 | 0.2 | 0.7 | 15.0 | 0.1 | 14.7 | 14.3 | 38 | 33 |
| Comparative Example 5 | Molding example 3 | Pressure sensitive adhesive 1 | MBS-1 | 91 | 0.4 | 0.7 | 16.4 | 0.1 | 14.6 | 14.0 | 37 | 32 |
| Comparative Example 6 | Molding example 3 | Pressure sensitive adhesive 2 | PU-1 | 89 | 5.2 | 0.7 | 7.8 | 1.3 | 13.9 | 13.2 | 34 | 30 |
| Comparative Example 7 | Molding example 3 | Pressure sensitive adhesive 2 | PU-2 | 85 | 7.8 | 0.7 | 7.6 | 2.0 | 11.1 | 10.6 | 30 | 25 |
| Comparative Example 8 | Molding example 3 | None | none | 93 | 1.4 | 0.7 | — | 0.5 | 10.7 | 8.2 | 38 | 33 |
| Comparative Example 9 | none | None | PET-2 | 93 | 0.9 | 5.8 | — | 7.3 | 4.0 | 0.7 | 4 | 1 |
| Comparative Example 10 | none | None | PA-2 | 91 | 3.3 | 4.5 | — | 1.6 | 4.4 | 1.3 | 5 | 2 |
| Comparative Example 11 | none | None | PC-1 | 92 | 0.4 | 3.2 | — | 5.1 | 4.9 | 1.8 | 4 | 1 |
| Comparative Example 12 | none | None | PVC-1 | 91 | 1.7 | 2.8 | — | 2.4 | 5.4 | 2.9 | 5 | 2 |
| Comparative Example 13 | White opage film for solar cells | | | 22 | 95.1 | 0.5 | 3.2 | 10.0 | 13.8 | 13.2 | 38 | 35 |
| Comparative Example 14 | ETFE film | Pressure sensitive adhesive 3 | PET-3 | 89 | 5.0 | 1.0 | 9.0 | 3.9 | 11.2 | 10.1 | 33 | 29 |
| Reference Example 1 | none | None | none | — | — | — | — | — | 15.0 | | — | — |
| Reference Example 2 | none | None | none | — | — | — | — | — | — | — | | 41 |

<Discussion>

The laminates according to all the Examples were excellent in transparency (total light transmittance, HAZE), anti-fouling property and anti-scattering property. On the other hand, the laminate according to the Comparative Examples did not obtain satisfactory characteristics in at least one of these characteristics. A detailed discussion is added below.

From the comparison between Examples 1 to 6 and Comparative Example 1, it can be understood that the layer A had the PVDF of less than 50% by mass and the acrylic resin of more than 50% by mass, so that the anti-fouling property was lowered.

From the comparison between Examples 3 and 7 to 11 and Comparative Example 2, since the PVDF of the layer B exceeded 50% by mass and the acrylic resin was less than 50% by mass, it can be understood that the adhesive strength between the layer B/layer C is lowered and the anti-scattering property is lowered.

From the comparison between Examples 3 and 14, and the comparison between Examples 12 and 13, it can be understood that there was no change in the physical properties depending on the presence or absence of the layer D.

From the comparison between Examples 13 to 23 and Comparative Examples 3 to 5, regardless of the manufacturer and material of the layer C, it can be understood that if the integrated value from 0 mm to 50 mm of displacement calculated from the load-displacement diagram of the laminate was less than 1.0 Nm (=J), the anti-scattering property was reduced.

From the comparison between Examples 17 to 20 and Comparative Example 3, even if the layer C exhibits ductile fracture and has a yield point, it can be understood that when the integrated value from 0 mm to 50 mm of displacement calculated from the load-displacement diagram of the laminate was less than 1.0 Nm (=J), the anti-scattering property was reduced. As a result, it is considered important that the integral value of the laminate satisfies 1.0 Nm (=J) or more in order to exhibit the anti-scattering property.

From the comparison between Examples 13 to 23 and Comparative Examples 4 and 5, when the layer C exhibits brittle fracture, it can be understood that the integrated value from 0 mm to 50 mm of displacement calculated from the load-displacement diagram of the laminate was less than 1.0 Nm (=J), and the anti-scattering property was lowered.

From the comparison between Examples 13 to 23 and Comparative Examples 6 and 7, when the layer C did not have a yield point, it can be understood that even if the layer D, which is an adhesive layer, is used between the layer B/layer C, the adhesive strength between the layer B/layer C became insufficient and the anti-scattering property was lowered.

From the comparison between Examples 3, 12 and 24 and Comparative Example 8, when the layer C was not provided, it can be understood that the integrated value from 0 mm to 50 mm of displacement calculated from the load-displacement diagram of the laminate was less than 1.0 Nm (=J), and the anti-scattering property was lowered.

From the comparison between Examples 3, 14, 22 to 24 and Comparative Examples 9 to 12, it can be understood that the anti-fouling property of the laminated body was lowered due to absence of the layer A/layer B.

From the comparison between Examples 3 and 25 and Comparative Example 13, it can be understood that when the total light transmittance and HAZE were high, transparency was not obtained after the application to the structure. Further, it can be understood that the adhesiveness to the pressure sensitive adhesive layer was poor and the adhesive was peeled off after being attached to the adherend, resulting in a decrease in the anti-scattering property.

As the white opaque film for solar cells of Comparative Example 13, a film having a lamination structure of Kynar PGM TR film/PET film/Kynar PGM TR film (KPK back sheet manufactured by Arkema Co., Ltd., thickness 330 μm) was used. It has been known that the Kynar PGM TR film (manufactured by Arkema) used for the KPK backsheet has a two-kind, three-layer structure in which an intermediate layer of a fluoropolymer/pigment mixture is sandwiched between PVDF 100% single layers, and exhibits a unique white color. Since the surface layer of the KPK back sheet is a single layer of PVDF 100%, it is considered that the pressure sensitive adhesive was easily peeled off from the adherend, so that the anti-scattering property could not be obtained.

From the comparison between Example 3 and Comparative Example 14, when a single-layer film of an ethylene-tetrafluoroethylene (ETFE) copolymer (manufactured by AGC, Aflex 25N1250S, thickness 25 μm) was used, it can be understood that the adhesive strength with the layer C was insufficient and the anti-scattering property was lowered.

The laminate of the present invention can be widely used as an application for attaching to the above-mentioned structure to take advantage of its excellent mechanical properties such as antifouling property and anti-scattering property, as well as for (1) Laminates for signboards; (2) Laminates for interior and exterior materials of buildings; (3) Laminates for synthetic resin skin material that maintain the design and aesthetics of the interior or exterior of vehicles such as automobiles, motorized bicycles, light vehicles and trolley buses for a long period of time; (4) Laminates for synthetic resin skin material that maintain the design and aesthetics of the interior or exterior of railway vehicles such as trains and express railways for a long period of time; (5) Laminates for synthetic resin skin material that maintain the design and aesthetics of the interior or exterior of aircraft such as airplanes for a long period of time; (6) Laminates for protective materials that maintain the design and aesthetics of important cultural properties for a long period of time.

DESCRIPTION OF REFERENCE NUMERALS 10, 20, 30, 40 Laminate
11 Layer A
12 Layer B
13 Layer D
14 Layer C
15 Layer E
16 Separator
17 Structure

The invention claimed is:

1. A laminate, comprising at least the following layers A to C:
   (A) a layer A comprising a resin composition comprising (i) 50 parts by mass or more and 100 parts by mass or less of a polyvinylidene fluoride-based resin, and (ii) 0 parts by mass or more and 50 parts by mass or less of a poly (meth) acrylic acid ester-based resin wherein (i) and (ii) total 100 parts by mass;
   (B) a layer B comprising a resin composition comprising (i) 0 parts by mass or more and less than 50 parts by mass of a polyvinylidene fluoride-based resin and (ii) more than 50 parts by mass and 100 parts by mass or less of a poly (meth) acrylic acid ester-based resin wherein (i) and (ii) total 100 parts by mass; and
   (C) a layer C comprising a resin or a resin composition that exhibits ductile fracture and has a yield point,
   in this order, wherein a total light transmittance measured according to a measurement method specified in JIS K7361-1-1997 is 90% or more, an integrated value from 0 mm to 50 mm of displacement calculated from a load-displacement diagram obtained by carrying out a tensile property test method in accordance with JIS K7161-1994 under conditions of test speed: 200 mm/min, gauge length: 50 mm, and width of test piece: 10 mm is 1.0 Nm (=J) or more; and an adhesive strength between the layer B and the layer C measured in accordance with JIS Z0237-2009 is 10 N/25 mm or more.

2. The laminate according to claim 1, wherein a total content of the polyvinylidene fluoride-based resin and the poly (meth) acrylic acid ester-based resin in the resin composition of layer A is 80% by mass or more.

3. The laminate according to claim 1, wherein a total content of the polyvinylidene fluoride-based resin and the poly (meth) acrylic acid ester-based resin in the resin composition of layer B is 80% by mass or more.

4. The laminate according to claim 1, wherein when carrying out the tensile property test method in accordance with JIS K7161-1994 under conditions of test speed: 200 mm/min, gauge length: 50 mm, and width of test piece: 10 mm, a nominal tensile strain (elongation) of the layer C is 100% or more.

5. The laminate according to claim 1, wherein a HAZE measured according to a measurement method specified in JIS K7136-2000 is 60% or less.

6. The laminate according to claim 1, wherein the resin composition composing the layer B contains 0.05 to 15 parts by mass of an ultraviolet absorber.

7. The laminate according to claim 1, wherein the resin or the resin composition composing the layer C comprises one or more selected from a group consisting of polycarbonate-based resin, polyamide-based resin, polyethylene terephthalate-based resin, polyvinyl chloride-based resin, and acrylonitrile-butadiene-styrene copolymer (ABS resin).

8. The laminate according to claim 7, wherein a total content of the polycarbonate-based resin, the polyamide-based resin, the polyethylene terephthalate-based resin, the polyvinyl chloride-based resin, and the acrylonitrile-butadiene-styrene copolymer (ABS resin) in the resin or the resin composition composing the layer C is 80% by mass or more.

9. The laminate according to claim 1, wherein the layer C is a biaxially oriented layer.

10. The laminate according to claim 1, wherein the layer B and the layer C are in direct contact with each other.

11. A method for manufacturing the laminate according to claim 10, comprising following steps:
   Step 1: a step of preparing a laminate in which the layer A and the layer B are laminated; and
   Step 2-A: a step of heat-sealing the layer C on a surface of the laminate opposite to a side on which the layer A is laminated with respect to the layer B.

12. The laminate according to claim 1, wherein a layer D comprising an adhesive is laminated between the layer B and the layer C.

13. A method for manufacturing the laminate according to claim 12, comprising following steps:
   Step 1: a step of preparing a laminate in which the layer A and the layer B are laminated;
   Step 2-B1: a step of forming the layer D on a surface of the laminate after Step 1 opposite to a side on which the layer A is laminated with respect to the layer B; and
   Step 2-C1: a step of forming the layer C on a surface of the laminate after Step 2-B1 opposite to a side on which the layer B is laminated with respect to the layer D;
   Alternatively,
   Step 1: a step of preparing a laminate in which the layer A and the layer B are laminated;
   Step 2-B2: a step of preparing a laminate in which the layer C and the layer D are laminated; and
   Step 2-C2: a step of attaching a surface of the laminate after Step 1 opposite to a side on which the layer A is laminated with respect to the layer B to a surface of the laminate after Step 2-B2 opposite to a side on which the layer C is laminated with respect to the layer D.

14. A laminate, wherein a layer E comprising an adhesive is laminated on a surface of the laminate according to claim 1 opposite to a side on which the layer B is laminated with respect to the layer C.

15. The laminate according to claim 14, wherein the adhesive of the layer E is a two-component mixing type pressure sensitive adhesive, a two-component curable adhesive, a thermosetting adhesive, or a UV curable adhesive.

16. A structure in which the laminate according to claim 14 is attached to the structure with the layer E as an attachment side.

17. The structure according to claim 16, wherein the structure is comprised of one or more types of material selected from a group consisting of poly (meth) acrylic acid ester-based resin, polyvinyl chloride-based resin, polycarbonate-based resin, polystyrene-based resin, acrylonitrile-butadiene-styrene copolymer (ABS resin), glass, concrete and metal.

18. The structure according to claim 16, wherein the structure is a sound insulation wall or an exterior panel that is light transmissive or non-light transmissive.

19. The structure according to claim 18, wherein the structure is the sound insulation wall that has been installed for one year or more or the exterior panel that has been installed for one year or more.

20. A method for protecting or repairing a structure, comprising a step J of attaching the laminate according to claim 14 to the structure with the layer E as an attachment side.

21. The method for protecting or repairing a structure according to claim 20, wherein the structure comprises one or more types of material selected from a group consisting of poly (meth) acrylic acid ester-based resin, polyvinyl chloride-based resin, polycarbonate-based resin, polystyrene-based resin, acrylonitrile-butadiene-styrene copolymer (ABS resin), glass, concrete and metal.

22. The method for protecting or repairing a structure according to claim 20, wherein the structure is a sound insulation wall or an exterior panel.

23. The method for protecting or repairing a structure according to claim 22, wherein the structure is the sound insulation wall that has been installed for one year or more or the exterior panel that has been installed for one year or more.

* * * * *